US009617709B2

(12) United States Patent
Shintani et al.

(10) Patent No.: US 9,617,709 B2
(45) Date of Patent: Apr. 11, 2017

(54) WORK VEHICLE AND METHOD OF CONTROLLING WORK VEHICLE

(71) Applicant: KOMATSU LTD., Tokyo (JP)

(72) Inventors: Satoru Shintani, Hirakata (JP); Yuto Fujii, Takatsuki (JP); Masanobu Seki, Fujisawa (JP); Masashi Ichihara, Hiratsuke (JP); Yoshiki Kami, Hadano (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/655,130

(22) PCT Filed: Feb. 2, 2015

(86) PCT No.: PCT/JP2015/052837
§ 371 (c)(1),
(2) Date: Jun. 24, 2015

(87) PCT Pub. No.: WO2016/125232
PCT Pub. Date: Aug. 11, 2016

(65) Prior Publication Data
US 2016/0312434 A1    Oct. 27, 2016

(51) Int. Cl.
*G06F 7/70*    (2006.01)
*G06F 19/00*    (2011.01)
(Continued)

(52) U.S. Cl.
CPC ............ *E02F 3/435* (2013.01); *E02F 3/3677* (2013.01); *E02F 3/3681* (2013.01); *E02F 3/43* (2013.01);
(Continued)

(58) Field of Classification Search
CPC ......... E02F 3/435; E02F 3/3677; E02F 9/264; E02F 9/2004; E02F 3/3681; E02F 9/2037;
(Continued)

(56) References Cited

U.S. PATENT DOCUMENTS 4,277,899 A * 7/1981 Guthoff .................. E02F 3/301
116/220
4,332,517 A * 6/1982 Igarashi .................. E02F 3/437
172/4.5

(Continued)

FOREIGN PATENT DOCUMENTS

JP    H09-328774 A    12/1997
JP    2014-074319 A    4/2014
(Continued)

*Primary Examiner* — Jaime Figueroa
(74) *Attorney, Agent, or Firm* — Drinker Biddle & Reath LLP

(57) ABSTRACT

A work vehicle includes a vehicular body, a work implement, an angle sensor, and a work implement control unit. A bucket is rotatable with respect to an arm around a bucket axis in parallel to an arm axis and a tilt axis orthogonal to a bucket axis. The angle sensor is provided in the bucket and detects an angle of inclination of the bucket with respect to a horizontal plane. The work implement control unit starts control of the work implement in which an operation of the work implement is controlled at least partially automatically when an angle of inclination of the bucket detected by the angle sensor is smaller than a first threshold value, and does not start control of the work implement when an angle of inclination of the bucket detected by the angle sensor is equal to or greater than the first threshold value.

16 Claims, 9 Drawing Sheets

(51) Int. Cl.
*G06G 7/00* (2006.01)
*G06G 7/76* (2006.01)
*E02F 3/43* (2006.01)
*E02F 9/22* (2006.01)
*E02F 9/26* (2006.01)
*E02F 3/36* (2006.01)
*E02F 9/20* (2006.01)
*E02F 3/32* (2006.01)

(52) U.S. Cl.
CPC .......... *E02F 9/2004* (2013.01); *E02F 9/2037* (2013.01); *E02F 9/22* (2013.01); *E02F 9/26* (2013.01); *E02F 9/261* (2013.01); *E02F 9/264* (2013.01); *B60Y 2200/412* (2013.01); *B60Y 2400/306* (2013.01); *B60Y 2400/406* (2013.01); *B60Y 2400/92* (2013.01); *E02F 3/32* (2013.01)

(58) Field of Classification Search
CPC ..... E02F 9/261; E02F 9/22; E02F 3/43; E02F 9/26; E02F 3/32; B60Y 2400/92; B60Y 2400/306; B60Y 2400/406; B60Y 2200/412
USPC ....................................................... 701/1, 50
See application file for complete search history.

(56) References Cited

U.S. PATENT DOCUMENTS

| | | | | |
|---|---|---|---|---|
| 5,682,312 | A * | 10/1997 | Rocke | E02F 3/439 37/414 |
| 7,949,449 | B2 * | 5/2011 | Koch | E02F 3/437 37/414 |
| 8,160,783 | B2 * | 4/2012 | Shull | E02F 3/431 172/1 |
| 2003/0019132 | A1* | 1/2003 | Kurenuma | E02F 3/437 37/348 |
| 2008/0313935 | A1* | 12/2008 | Trifunovic | E02F 3/432 37/413 |
| 2009/0158625 | A1 | 6/2009 | Pope et al. | |
| 2009/0159302 | A1* | 6/2009 | Koch | E02F 9/265 172/2 |
| 2009/0326768 | A1* | 12/2009 | Shull | E02F 3/431 701/50 |
| 2010/0254793 | A1* | 10/2010 | Trifunovic | E02F 3/432 414/700 |
| 2014/0100744 | A1 | 4/2014 | Johnson et al. | |
| 2014/0343800 | A1* | 11/2014 | Nelson | E02F 3/845 701/49 |

FOREIGN PATENT DOCUMENTS

| | | |
|---|---|---|
| KR | 10-2014-0093604 A | 7/2014 |
| WO | WO-2014/054354 A1 | 4/2014 |

* cited by examiner

TARGET DESIGN TOPOGRAPHY

WORK VEHICLE AND METHOD OF CONTROLLING WORK VEHICLE

TECHNICAL FIELD

The present invention relates to a work vehicle.

BACKGROUND ART

A work vehicle such as a hydraulic excavator includes a work implement containing a boom, an arm, and a bucket. In control of the work vehicle, excavation control in which a cutting edge of a bucket is controlled based on target design topography which is an aimed shape of an excavation target has been known. In addition, a tilt type bucket (a tilt bucket) of which opposing ends in a direction of vehicle width can be inclined with respect to an axis in the direction of vehicle width has been known. The tilt type bucket is inclined by a tilt actuator for tilting a bucket with respect to an arm as shown in Japanese Patent Laying-Open No. 2014-74319.

CITATION LIST

Patent Document

PTD 1: Japanese Patent Laying-Open No. 2014-74319

SUMMARY OF INVENTION

Technical Problem

In connection with a tilt type bucket, tilt angle data of a bucket can be obtained by using a tilt angle sensor.

The bucket is inclined with respect to the axis in the direction of vehicle width owing to drive of a tilt actuator and inclined with respect to an axis in a vehicle fore/aft direction also owing to a normal operation of a work implement. Therefore, it may be difficult for a tilt angle sensor to obtain tilt angle data based on drive of the tilt actuator due to an operation of the work implement. In such a case, excavation control based on accurate tilt angle data cannot be effected and accuracy in excavation control may lower.

The present invention was made to solve the problem described above, and an object of the present invention is to provide a technique for preventing lowering in accuracy in excavation control in a work vehicle including a tilt type bucket.

Solution to Problem

A work vehicle according to one aspect of the present invention includes a vehicular body, a work implement, an angle sensor, and a work implement control unit. The work implement has a boom, an arm, and a bucket. The boom is rotatable with respect to the vehicular body around a boom axis. The arm is rotatable with respect to the boom around an arm axis in parallel to the boom axis. The bucket is rotatable with respect to the arm around a bucket axis in parallel to the arm axis and a tilt axis orthogonal to the bucket axis. The angle sensor is provided in the bucket and detects an angle of inclination of the bucket with respect to a horizontal plane. The work implement control unit executes control of the work implement in which an operation of the work implement is controlled at least partially automatically based on design topography representing an aimed shape of a target of working by the work implement. The work implement control unit starts control of the work implement when an angle of inclination of the bucket detected by the angle sensor is smaller than a first threshold value, and does not start control of the work implement when an angle of inclination of the bucket detected by the angle sensor is equal to or greater than the first threshold value.

According to the above, the work implement control unit starts control of the work implement when the angle of inclination of the bucket detected by the angle sensor is smaller than the first threshold value, and does not start control of the work implement when the angle of inclination of the bucket detected by the angle sensor is equal to or greater than the first threshold value. Thus, control of the work implement in a state that accuracy in detection of the angle of inclination of the bucket is high is executed and control of the work implement in a state that accuracy in detection of the angle of inclination of the bucket is low is prohibited. Thus, excavation accuracy can be improved and intended construction can be carried out.

Preferably, the work implement control unit starts control of the work implement when the angle of inclination of the bucket detected by the angle sensor is smaller than the first threshold value or equal to or greater than a second threshold value, and does not start control of the work implement when the angle of inclination of the bucket detected by the angle sensor is equal to or greater than the first threshold value and smaller than the second threshold value.

According to the above, when the angle of inclination of the bucket detected by the angle sensor is smaller than the first threshold value or equal to the second threshold value, the work implement control unit executes control of the work implement, and when the angle of inclination of the bucket detected by the angle sensor is equal to or greater than the first threshold value and smaller than the second threshold value, the work implement control unit does not execute control of the work implement. Thus, control of the work implement in a state of a range in which accuracy in detection of the angle of inclination of the bucket is high is executed, and control of the work implement in a state of a range in which accuracy in detection of the angle of inclination of the bucket is low is prohibited. Thus, excavation accuracy can be improved and intended construction can be carried out.

Preferably, the work vehicle further includes an inclination detection portion, an attitude state obtaining portion, and a tilt axis angle calculation portion. The inclination detection portion detects an inclination of the vehicular body with respect to the horizontal plane. The attitude state obtaining portion obtains attitude information on an attitude of the work implement. The tilt axis angle calculation portion calculates an angle of inclination of the tilt axis with respect to the horizontal plane based on the inclination of the vehicular body and the attitude information of the work implement. The work implement control unit starts control of the work implement when an angle of inclination of the tilt axis calculated by the tilt axis angle calculation portion is smaller than a second threshold value, and does not start control of the work implement when the angle of inclination of the tilt axis calculated by the tilt axis angle calculation portion is equal to or greater than the second threshold value.

According to the above, the work implement control unit further executes control of the work implement when the angle of inclination of the tilt axis calculated by the tilt axis angle calculation portion is smaller than the second threshold value, and does not execute control of the work implement when the angle of inclination of the tilt axis calculated by the tilt axis angle calculation portion is equal to or greater than the second threshold value. Thus, the work implement in a state that accuracy in detection of the angle of inclination of the bucket is high is carried out and the work implement in a state that accuracy in detection of the angle of inclination of the bucket is low is prohibited. Thus, excavation accuracy can further be improved and intended construction can be carried out.

Preferably, the work vehicle further includes an operation portion. The operation portion can accept an instruction to start control of the work implement from an operator. The work implement control unit executes control of the work implement in response to the instruction to start issued from the operation portion, and the operation portion does not accept the instruction to start control of the work implement from the operator when the angle of inclination of the bucket detected by the angle sensor is equal to or greater than the first threshold value.

According to the above, an instruction to start control of the work implement from the operator is not accepted in a state that accuracy in detection of the angle of inclination of the bucket is low. Thus, the operator is informed of the fact that excavation accuracy has lowered and the operator can be invited to execute control of the work implement in a state that excavation accuracy is high.

Preferably, the work vehicle further includes a display portion and a display control unit. The display control unit controls contents of display on the display portion. The display control unit has the display portion display information that control of the work implement cannot be started by the operator when the angle of inclination of the bucket detected by the angle sensor is equal to or greater than the first threshold value.

According to the above, the operator is notified of the fact that excavation accuracy has lowered in a state that the accuracy in detection of the angle of inclination of the bucket is low, so that the operator can be invited to execute control of the work implement in a state that excavation accuracy is high.

A work vehicle according to another aspect of the present invention includes a vehicular body, a work implement, an inclination detection portion, an attitude state obtaining portion, a tilt axis angle calculation portion, and a work implement control unit. The work implement has a boom, an arm, and a bucket. The boom is rotatable with respect to the vehicular body around a boom axis. The arm is rotatable with respect to the boom around an arm axis in parallel to the boom axis. The bucket is rotatable with respect to the arm around a bucket axis in parallel to the arm axis and a tilt axis orthogonal to the bucket axis. The inclination detection portion detects an inclination of the vehicular body with respect to a horizontal plane. The attitude state obtaining portion obtains attitude information on an attitude of the work implement. The tilt axis angle calculation portion calculates an angle of inclination of the tilt axis with respect to the horizontal plane based on the inclination of the vehicular body and the attitude information of the work implement. The work implement control unit executes control of the work implement in which an operation of the work implement is controlled at least partially automatically based on design topography representing an aimed shape of a target of working by the work implement. The work implement control unit starts control of the work implement when an angle of inclination of the tilt axis calculated by the tilt axis angle calculation portion is smaller than a first threshold value, and does not start control of the work implement when the angle of inclination of the tilt axis calculated by the tilt axis angle calculation portion is equal to or greater than the first threshold value.

According to the above, when the angle of inclination of the tilt axis calculated by the tilt axis angle calculation portion is smaller than the first threshold value, the work implement control unit executes control of the work implement, and when the angle of inclination of the tilt axis calculated by the tilt axis angle calculation portion is equal to or greater than the first threshold value, the work implement control unit does not execute control of the work implement. Thus, control of the work implement in a state that accuracy in detection of the angle of inclination of the bucket is high is executed and control of the work implement in a state that accuracy in detection of the angle of inclination of the bucket is low is prohibited. Thus, excavation accuracy can be improved and intended construction can be carried out.

Preferably, the work implement control unit starts control of the work implement when the angle of inclination of the tilt axis calculated by the tilt axis angle calculation portion is smaller than the first threshold value or equal to or greater than a second threshold value, and does not start control of the work implement when the angle of inclination of the tilt axis calculated by the tilt axis angle calculation portion is equal to or greater than the first threshold value and smaller than the second threshold value.

According to the above, when the angle of inclination of the tilt axis calculated by the tilt axis angle calculation portion is smaller than the first threshold value or equal to the second threshold value, the work implement control unit executes control of the work implement, and when the angle of inclination of the tilt axis calculated by the tilt axis angle calculation portion is equal to or greater than the first threshold value and smaller than the second threshold value, the work implement control unit does not execute control of the work implement. Thus, control of the work implement is executed in a state of a range in which accuracy in detection of the angle of inclination of the bucket is high, and control of the work implement in a state of a range in which accuracy in detection of the angle of inclination of the bucket is low is prohibited. Thus, excavation accuracy can be improved and intended construction can be carried out.

Preferably, the work vehicle further includes an operation portion. The operation portion can accept an instruction to start control of the work implement from an operator. The work implement control unit executes control of the work implement in response to the instruction to start issued from the operation portion. The operation portion does not accept the instruction to start control of the work implement from the operator when the angle of inclination of the tilt axis calculated by the tilt axis angle calculation portion is equal to or greater than the first threshold value.

According to the above, an instruction to start the work implement from the operator is not accepted in a state that accuracy in detection of the angle of inclination of the bucket is low. Thus, the operator is informed of the fact that excavation accuracy has lowered and the operator can be invited to execute control of the work implement in a state that excavation accuracy is high.

Preferably, the work vehicle further includes a display portion and a display control unit. The display control unit controls contents of display on the display portion. The display control unit has the display portion display information that control of the work implement cannot be started by the operator when the angle of inclination of the tilt axis calculated by the tilt axis angle calculation portion is equal to or greater than the first threshold value.

According to the above, the operator is notified of the fact that excavation accuracy has lowered in a state that accuracy in detection of the angle of inclination of the bucket is low, so that the operator can be invited to execute control of the work implement in a state that excavation accuracy is high.

A work vehicle according to yet another aspect of the present invention includes a work implement, an angle sensor, an attitude state obtaining portion, and a display control unit. The work implement has a boom, an arm, and a bucket. The boom is rotatable with respect to a vehicular body around a boom axis. The arm is rotatable with respect to the boom around an arm axis in parallel to the boom axis. The bucket is rotatable with respect to the arm around a bucket axis in parallel to the arm axis and a tilt axis orthogonal to the bucket axis. The angle sensor is provided in the bucket and detects an angle of inclination of the bucket with respect to a horizontal plane.

The attitude state obtaining portion obtains attitude information on an attitude of the work implement based on a result of detection by the angle sensor. The display control unit has a state of attitude of the bucket with respect to design topography representing an aimed shape of a target of working by the work implement displayed based on the attitude information. When the angle of inclination of the bucket detected by the angle sensor is smaller than a first threshold value, the display control unit has a state of attitude of the bucket in accordance with the angle of inclination of the bucket detected by the angle sensor displayed, and when the angle of inclination of the bucket detected by the angle sensor is equal to or greater than the first threshold value, the display control unit has a state of attitude of the bucket displayed based on a result of detection by the angle sensor at the time when the angle of inclination of the bucket detected by the angle sensor was smaller than the first threshold value.

According to the above, when the angle of inclination of the bucket detected by the angle sensor is smaller than the first threshold value, the display control unit has a state of attitude of the bucket in accordance with the angle of inclination of the bucket detected by the angle sensor displayed, and when the angle of inclination of the bucket detected by the angle sensor is equal to or greater than the first threshold value, the display control unit has a state of attitude of the bucket displayed based on a result of detection by the angle sensor at the time when the angle of inclination of the bucket was smaller than the first threshold value. By displaying a state of attitude of the bucket in a state that accuracy in detection of the angle of inclination of the bucket is high, an excavation work high in accuracy can be carried out owing to representation based on information high in detection accuracy.

Preferably, the work vehicle further includes an inclination detection portion and a tilt axis angle calculation portion. The inclination detection portion detects an inclination of the vehicular body with respect to the horizontal plane. The tilt axis angle calculation portion calculates an angle of inclination of the tilt axis with respect to the horizontal plane based on the inclination of the vehicular body and the attitude information of the work implement. When the angle of inclination of the tilt axis calculated by the tilt axis angle calculation portion is smaller than a second threshold value and the angle of inclination of the bucket detected by the angle sensor is smaller than the first threshold value, the display control unit has a state of attitude of the bucket in accordance with the angle of inclination of the bucket detected by the angle sensor displayed, and when the angle of inclination of the tilt axis calculated by the tilt axis angle calculation portion is equal to or greater than the second threshold value or the angle of inclination of the bucket detected by the angle sensor is equal to or greater than the first threshold value, the display control unit has a state of attitude of the bucket displayed based on a result of detection by the angle sensor at the time when the angle of inclination of the bucket detected by the angle sensor was smaller than the first threshold value.

According to the above, when the angle of inclination of the tilt axis calculated by the tilt axis angle calculation portion is smaller than the second threshold value, the display control unit has a state of attitude of the bucket in accordance with the angle of inclination of the bucket detected by the angle sensor displayed, and when the angle of inclination of the tilt axis calculated by the tilt axis angle calculation portion is equal to or greater than the second threshold value, the display control unit has a state of attitude of the bucket displayed based on a result of detection by the angle sensor at the time when the angle of inclination of the bucket was smaller than the first threshold value. By displaying a state of attitude of the bucket in a state that accuracy in detection of the angle of inclination of the bucket is high, an excavation work higher in accuracy can be carried out.

Preferably, when the angle of inclination of the bucket detected by the angle sensor is equal to or greater than the first threshold value, the display control unit has a state of attitude of the bucket displayed in a fixed manner based on a result of detection by the angle sensor at the time when the angle of inclination of the bucket detected by the angle sensor was smaller than the first threshold value.

According to the above, when the angle of inclination of the bucket detected by the angle sensor is equal to or greater than the first threshold value, the display control unit has a state of attitude of the bucket displayed in a fixed manner based on a result of detection by the angle sensor at the time when the angle of inclination of the bucket detected by the angle sensor was smaller than the first threshold value. Thus, misrecognition by the operator can be suppressed by fixed representation based on information high in detection accuracy.

Preferably, the display control unit further has an icon displayed, which indicates accuracy in detection by the angle sensor, and varies a state of the icon based on the angle of inclination of the bucket detected by the angle sensor.

According to the above, the operator can instantaneously know a condition of detection accuracy and an excavation work high in accuracy can be carried out.

A method of controlling a work vehicle according to one aspect of the present invention is a method of controlling a work vehicle including a work implement containing a boom rotatable with respect to a vehicular body around a boom axis, an arm rotatable with respect to the boom around an arm axis in parallel to the boom axis, and a bucket rotatable with respect to the arm around a bucket axis in parallel to the arm axis and a tilt axis orthogonal to the bucket axis. The control method includes the steps of detecting an angle of inclination of the bucket with respect to a horizontal plane, starting control of the work implement in which an operation of the work implement is controlled at least partially automatically based on design topography representing an aimed shape of a target of working by the work implement when a detected angle of inclination of the bucket is smaller than a first threshold value, and not starting control of the work implement when the detected angle of inclination of the bucket is equal to or greater than the first threshold value.

According to the above, control of the work implement is started when the detected angle of inclination of the bucket is smaller than the first threshold value, and control of the work implement is not started when the angle of inclination of the bucket detected by an angle sensor is equal to or greater than the first threshold value. Thus, control of the work implement in a state that accuracy in detection of the angle of inclination of the bucket is high is executed and control of the work implement in a state that accuracy in detection of the angle of inclination of the bucket is low is prohibited. Thus, excavation accuracy can be improved and intended construction can be carried out.

A method of controlling a work vehicle according to another aspect of the present invention is a method of controlling a work vehicle including a work implement containing a boom rotatable with respect to a vehicular body around a boom axis, an arm rotatable with respect to the boom around an arm axis in parallel to the boom axis, and a bucket rotatable with respect to the arm around a bucket axis in parallel to the arm axis and a tilt axis orthogonal to the bucket axis. The control method includes the steps of detecting an inclination of the vehicular body with respect to a horizontal plane, obtaining attitude information on an attitude of the work implement, calculating an angle of inclination of the tilt axis with respect to the horizontal plane based on the inclination of the vehicular body and the attitude information of the work implement, starting control of the work implement in which an operation of the work implement is controlled at least partially automatically based on design topography representing an aimed shape of a target of working by the work implement when a calculated angle of inclination of the tilt axis is smaller than a first threshold value, and not starting control of the work implement when the calculated angle of inclination of the tilt axis is equal to or greater than the first threshold value.

According to the above, control of the work implement is executed when the calculated angle of inclination of the tilt axis is smaller than the first threshold value, and control of the work implement is not executed when the calculated angle of inclination of the tilt axis is equal to or greater than the first threshold value. Thus, control of the work implement in a state that accuracy in detection of the angle of inclination of the bucket is high is executed and control of the work implement in a state that accuracy in detection of the angle of inclination of the bucket is low is prohibited. Thus, excavation accuracy can be improved and intended construction can be carried out.

A method of controlling a work vehicle according to yet another aspect of the present invention is a method of controlling a work vehicle including a work implement containing a boom rotatable with respect to a vehicular body around a boom axis, an arm rotatable with respect to the boom around an arm axis in parallel to the boom axis, and a bucket rotatable with respect to the arm around a bucket axis in parallel to the arm axis and a tilt axis orthogonal to the bucket axis. The control method includes the steps of detecting an angle of inclination of the bucket with respect to a horizontal plane, obtaining attitude information on an attitude of the work implement based on the detected angle of inclination of the bucket, displaying a state of attitude of the bucket with respect to design topography representing an aimed shape of a target of working by the work implement based on the attitude information when the detected angle of inclination of the bucket is smaller than a first threshold value, and obtaining, when the detected angle of inclination of the bucket is equal to or greater than the first threshold value, the attitude information based on the angle of inclination of the bucket at the time when the angle of inclination of the bucket was smaller than the first threshold value and displaying a state of attitude of the bucket based on the attitude information.

According to the above, when the detected angle of inclination of the bucket is smaller than the first threshold value, a state of attitude of the bucket in accordance with the detected angle of inclination of the bucket is displayed, and when the detected angle of inclination of the bucket is equal to or greater than the first threshold value, attitude information based on the angle of inclination of the bucket at the time when the angle of inclination of the bucket was smaller than the first threshold value is obtained and a state of attitude of the bucket is displayed on that attitude information. By displaying a state of attitude of the bucket in a state that accuracy in detection of the angle of inclination of the bucket is high, an excavation work high in accuracy can be carried out owing to representation based on information high in detection accuracy.

Advantageous Effects of Invention

The work vehicle can prevent lowering in accuracy in excavation control.

DESCRIPTION OF EMBODIMENTS

Though an embodiment of the present invention will be described hereinafter with reference to the drawings, the present invention is not limited thereto. Constituent features in each embodiment described below can be combined as appropriate. Some components may not be employed.

In the description below, each of a global coordinate system and a local coordinate system is set, and positional relation of each portion will be described with reference to such a coordinate system. The global coordinate system is a coordinate system with an origin Pr (see FIG. 4) fixed on the earth being defined as the reference. The local coordinate system is a coordinate system with an origin P0 (see FIG. 4) fixed to a vehicular body 1 of a work vehicle CM being defined as the reference. The local coordinate system may also be referred to as a vehicular body coordinate system.

In the description below, the global coordinate system is shown with an XgYgZg rectangular coordinate system. As will be described later, a reference position (the origin) Pg in the global coordinate system is located in an area of working. One direction in a horizontal plane is defined as an Xg-axis direction, a direction orthogonal to the Xg-axis direction in the horizontal plane is defined as a Yg-axis direction, and a direction orthogonal to each of the Xg-axis direction and the Yg-axis direction is defined as a Zg-axis direction. Directions of rotation (inclination) around the Xg axis, the Yg axis, and the Zg axis are defined as θXg, θYg, and θZg directions, respectively. The Xg axis is orthogonal to a YgZg plane. The Yg axis is orthogonal to an XgZg plane. The Zg axis is orthogonal to an XgYg plane. The XgYg plane is in parallel to the horizontal plane. The Zg-axis direction is a vertical direction.

In the description below, the local coordinate system is shown with an XYZ rectangular coordinate system. As will be described later, reference position (origin) P0 in the local coordinate system is located at a center of revolution AX of a revolving unit 3. One direction in a certain plane is defined as an X-axis direction, a direction orthogonal to the X-axis direction in that plane is defined as a Y-axis direction, and a direction orthogonal to each of the X-axis direction and the Y-axis direction is defined as a Z-axis direction. Directions of rotation (inclination) around the X axis, the Y axis, and the Z axis are defined as θx, θy, and θz directions, respectively. The X axis is orthogonal to a YZ plane. The Y axis is orthogonal to an XZ plane. The Z axis is orthogonal to an XY plane.

[Overall Construction of Work Vehicle]

Figure 1:
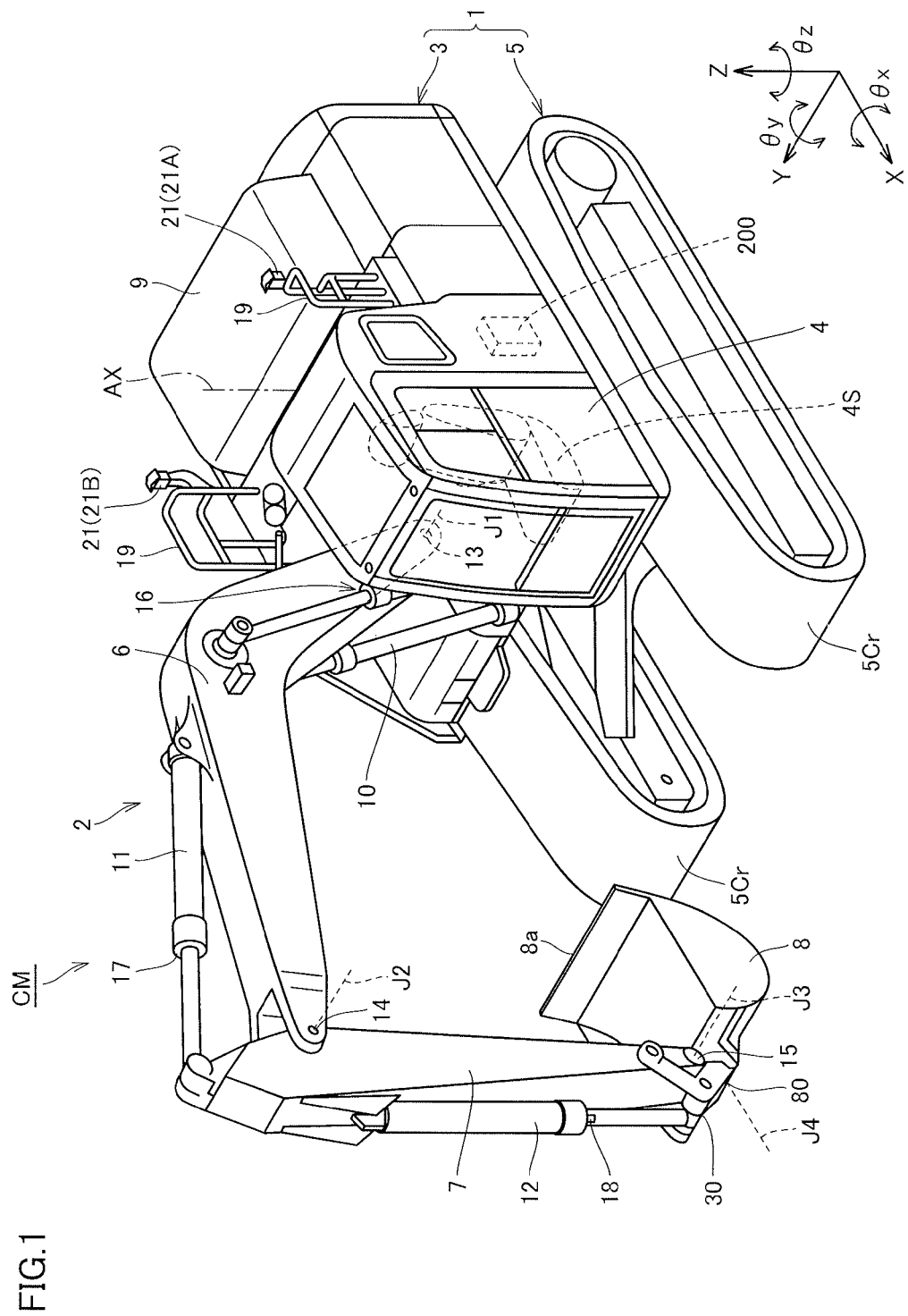
FIG. 1 is a perspective view showing one example of a work vehicle based on an embodiment.

FIG. 1 is a perspective view showing one example of a work vehicle based on an embodiment.

As shown in FIG. 1, in the present example, a hydraulic excavator CM including a work implement 2 actuated with a hydraulic pressure will be described by way of example as a work vehicle.

Hydraulic excavator CM includes vehicular body 1 and work implement 2. As will be described later, a control system 200 effecting excavation control is mounted on hydraulic excavator CM.

Vehicular body 1 has revolving unit 3, an operator's cab 4, and a traveling apparatus 5.

Revolving unit 3 is arranged on traveling apparatus 5. Traveling apparatus 5 supports revolving unit 3. Revolving unit 3 can revolve around axis of revolution AX. Operator's cab 4 is provided with an operator's seat 4S where an operator sits. The operator operates hydraulic excavator CM in operator's cab 4. Traveling apparatus 5 has a pair of crawler belts 5Cr. Hydraulic excavator CM travels as crawler belts 5Cr rotate. Traveling apparatus 5 may have wheels (tires).

In the present example, positional relation among portions will be described with the operator seated at operator's seat 4S being defined as the reference.

A fore/aft direction refers to a fore/aft direction with the operator who sits at operator's seat 4S being defined as the reference. A lateral direction refers to a lateral direction with the operator who sits at operator's seat 4S being defined as the reference. The lateral direction corresponds to a direction of width of the vehicle (a direction of vehicle width). A direction in which the operator sitting at operator's seat 4S faces is defined as a fore direction and a direction opposed to the fore direction is defined as an aft direction. A right side and a left side at the time when the operator sitting at operator's seat 4S faces front are defined as a right direction and a left direction, respectively. The fore/aft direction corresponds to the X-axis direction, and the lateral direction corresponds to the Y-axis direction. The direction in which the operator sitting at operator's seat 4S faces is the fore direction (a +X direction), and the direction opposite to the fore direction is the aft direction (a −X direction). A direction on one side of the direction of vehicle width at the time when the operator sitting at operator's seat 4S faces is the right direction (a +Y direction), and a direction on the other side of the direction of vehicle width is the left direction (a −Y direction).

Revolving unit 3 has an engine compartment 9 accommodating an engine and a counter weight provided in a rear portion of revolving unit 3. In revolving unit 3, a handrail 19 is provided in front of engine compartment 9. In engine compartment 9, an engine and a hydraulic pump are arranged.

Work implement 2 is connected to revolving unit 3.

Work implement 2 has a boom 6, an arm 7, a bucket 8, a boom cylinder 10, an arm cylinder 11, a bucket cylinder 12, and a tilt cylinder 30.

Boom 6 is connected to revolving unit 3 with a boom pin 13 being interposed. Arm 7 is connected to boom 6 with an arm pin 14 being interposed. Bucket 8 is connected to arm 7 with a bucket pin 15 and a tilt pin 80 being interposed. Boom cylinder 10 drives boom 6. Arm cylinder 11 drives arm 7. Bucket cylinder 12 drives bucket 8. A proximal end portion of boom 6 (a boom foot) and revolving unit 3 are connected to each other. A distal end portion of boom 6 (a boom top) and a proximal end portion of arm 7 (an arm foot) are connected to each other. A distal end portion of arm 7 (an arm top) and a proximal end portion of bucket 8 are connected to each other. Each of boom cylinder 10, arm cylinder 11, bucket cylinder 12, and tilt cylinder 30 is implemented by a hydraulic cylinder driven with a hydraulic oil.

Work implement 2 has a first stroke sensor 16, a second stroke sensor 17, and a third stroke sensor 18. First stroke sensor 16 is arranged in boom cylinder 10 and detects a stroke length of boom cylinder 10 (a boom cylinder length). Second stroke sensor 17 is arranged in arm cylinder 11 and detects a stroke length of arm cylinder 11 (an arm cylinder length). Third stroke sensor 18 is arranged in bucket cylinder 12 and detects a stroke length of bucket cylinder 12 (a bucket cylinder length).

Boom 6 is rotatable with respect to revolving unit 3 around a boom axis which is an axis of rotation. Arm 7 is rotatable with respect to boom 6 around an arm axis 12 which is an axis of rotation in parallel to boom axis J1. Bucket 8 is rotatable with respect to arm 7 around a bucket axis J3 which is an axis of rotation in parallel to boom axis J1 and arm axis J2. Bucket 8 is rotatable with respect to arm 7 around a tilt axis J4 which is an axis of rotation orthogonal to bucket axis J3. Boom pin 13 has boom axis J1. Arm pin 14 has arm axis J2. Bucket pin 15 has bucket axis J3. Tilt pin 80 has tilt axis J4.

Boom axis J1, arm axis J2, and bucket axis J3 are each in parallel to the Y axis. Boom 6, arm 7, and bucket 8 is each rotatable in the θy direction.

In the description below, a stroke length of boom cylinder 10 is also referred to as a boom cylinder length or a boom stroke. A stroke length of arm cylinder 11 is also referred to as an arm cylinder length or an arm stroke. A stroke length of bucket cylinder 12 is also referred to as a bucket cylinder length or a bucket stroke. A stroke length of tilt cylinder 30 is also referred to as a tilt cylinder length.

In the description below, a boom cylinder length, an arm cylinder length, a bucket cylinder length, and a tilt cylinder length are also collectively referred to as cylinder length data.

[Construction of Bucket]

Bucket 8 based on the embodiment will now be described.

Figure 2:
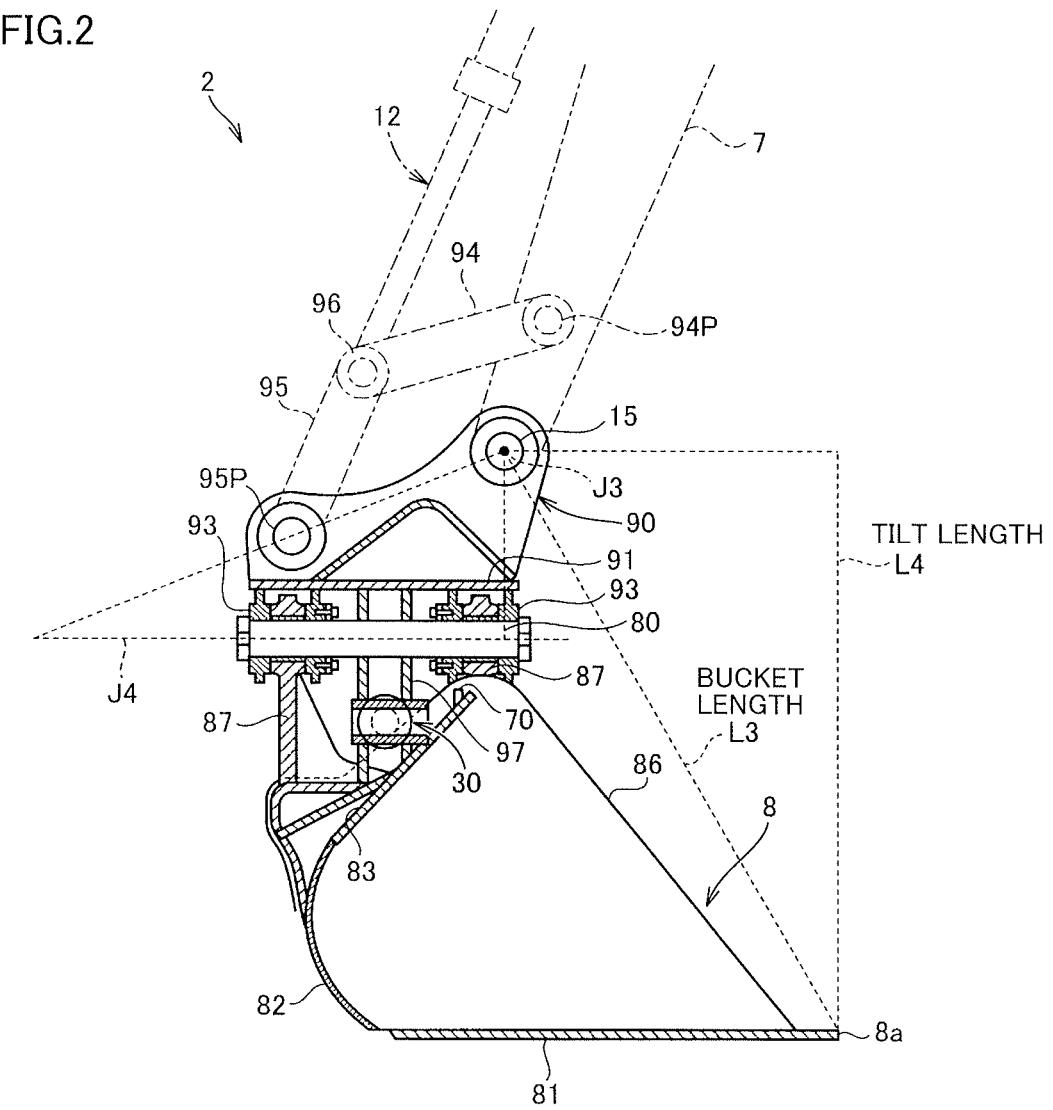
FIG. 2 is a lateral cross-sectional view showing one example of a bucket 8 according to the embodiment.
Figure 3:
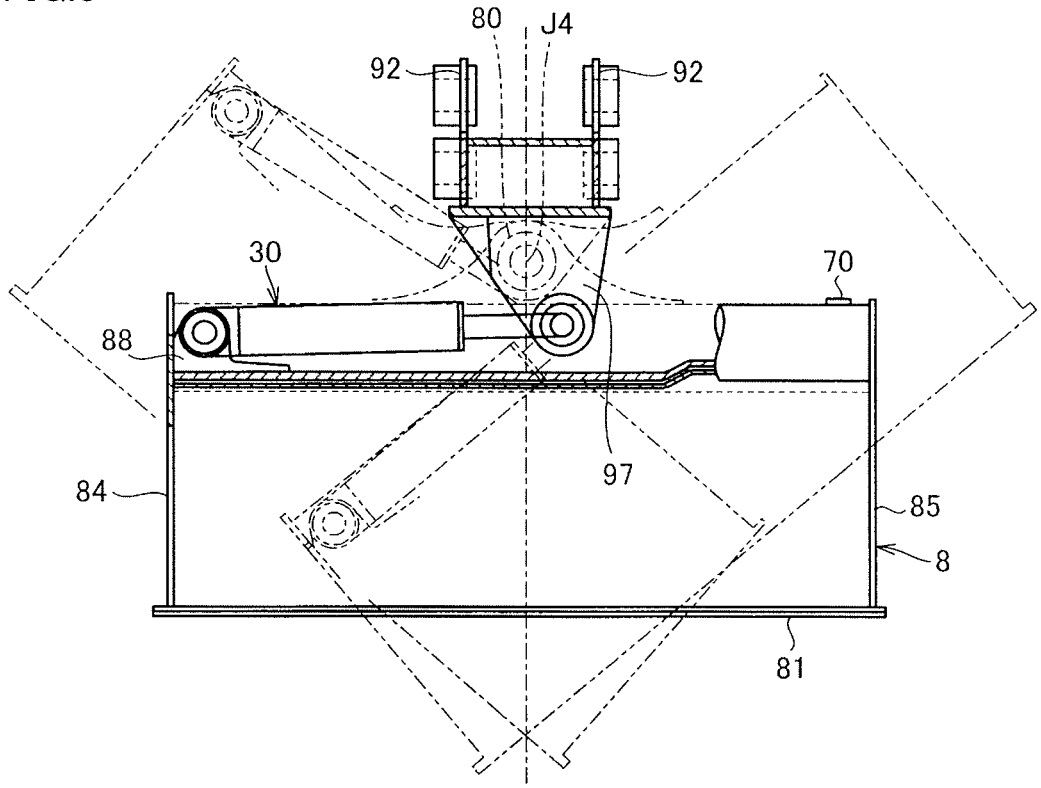
FIG. 3 is a front view showing one example of bucket 8 according to the embodiment.

FIG. 2 is a lateral cross-sectional view showing one example of bucket 8 according to the embodiment. FIG. 3 is a front view showing one example of bucket 8 according to the embodiment.

Bucket 8 is a tilt type bucket.

As shown in FIGS. 2 and 3, work implement 2 has bucket 8 which is rotatable with respect to arm 7 around bucket axis J3 and tilt axis J4 orthogonal to bucket axis J3. Bucket 8 is rotatably supported by arm 7 around bucket pin 15 (bucket axis J3). Bucket 8 is rotatably supported by arm 7 around tilt pin 80 (tilt axis J4).

Bucket 8 is connected to the distal end portion of arm 7 with a connection member (a base frame) 90 being interposed. Bucket pin 15 couples arm 7 and connection member 90 to each other. Tilt pin 80 couples connection member 90 and bucket 8 to each other. Bucket 8 is rotatably connected to arm 7 with connection member 90 being interposed.

Bucket 8 has a bottom plate 81, a back plate 82, an upper plate 83, a side plate 84, and a side plate 85. Bottom plate 81, upper plate 83, side plate 84, and side plate 85 define an opening 86 of bucket 8.

Bucket 8 has a bracket 87 provided above upper plate 83. Bracket 87 is placed at front and rear positions of upper plate 83. Bracket 87 is coupled to connection member 90 and tilt pin 80.

Connection member 90 has a plate member 91 and brackets 92 and 93. Bracket 92 is provided on an upper surface of plate member 91. Bracket 93 is provided on a lower surface of plate member 91. Bracket 92 is coupled to arm 7 and a second link member 95 which will be described later. Bracket 93 is placed on an upper portion of bracket 87 and coupled to tilt pin 80 and bracket 87.

Bucket pin 15 couples bracket 92 of connection member 90 and the distal end portion of arm 7 to each other. Tilt pin 80 couples bracket 93 of connection member 90 and bracket 87 of bucket 8 to each other. Thus, connection member 90 and bucket 8 are rotatable with respect to arm 7 around bucket axis J3, and bucket 8 is rotatable with respect to connection member 90 around tilt axis J4.

Work implement 2 has a first link member 94 and second link member 95. First link member 94 is rotatably connected to arm 7 with a first link pin 94P being interposed. Second link member 95 is rotatably connected to bracket 92 with a second link pin 95P being interposed.

A proximal end portion of first link member 94 is connected to arm 7 with first link pin 94P being interposed. A proximal end portion of second link member 95 is connected to bracket 92 with second link pin 95P being interposed. The distal end portion of first link member 94 and the distal end portion of second link member 95 are coupled to each other with a bucket cylinder top pin 96 being interposed.

The distal end portion of bucket cylinder 12 is rotatably connected to the distal end portion of first link member 94 and the distal end portion of second link member 95 with bucket cylinder top pin 96 being interposed. As bucket cylinder 12 extends and contracts, connection member 90 rotates around bucket axis J3, together with bucket 8.

Tilt cylinder 30 is connected to a bracket 97 provided in connection member 90 and a bracket 88 provided in bucket 8. A rod of tilt cylinder 30 is connected to bracket 97 with a pin being interposed. A main body portion of tilt cylinder 30 is connected to bracket 88 with a pin being interposed. As tilt cylinder 30 extends and contracts, bucket 8 rotates around tilt axis J4.

Thus, bucket 8 rotates around bucket axis J3 as bucket cylinder 12 is actuated. Bucket 8 rotates around tilt axis J4 as tilt cylinder 30 is actuated. As bucket 8 rotates around bucket axis J3, tilt pin 80 (tilt axis J4) rotates (is inclined) together with bucket 8.

Work implement 2 has a tilt angle sensor 70 detecting bucket angle data showing an angle of rotation (a tilt angle) δ of bucket 8 around tilt axis J4 and an angle of rotation (a pitch angle) φ of bucket 8 around bucket axis J3.

Specifically, tilt angle sensor 70 detects an angle of bucket 8 with respect to the horizontal plane in the global coordinate system. Tilt angle sensor 70 is an angle sensor capable of detecting angles with respect to two orthogonal axes included in the horizontal plane, and detects an angle of inclination in two directions of the θXg direction and the θYg direction. Tilt angle sensor 70 is provided in bucket 8.

[Structure of Hydraulic Excavator]

Figure 4:
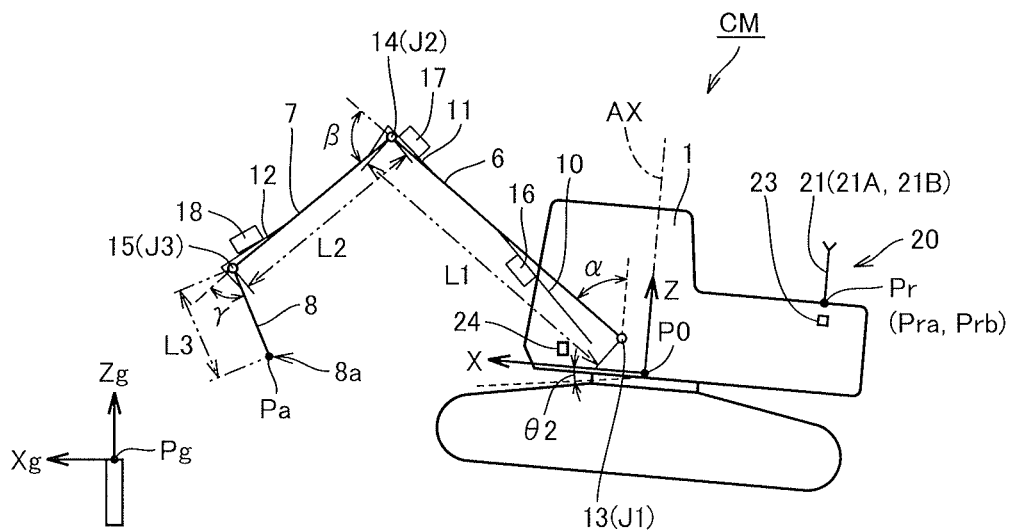
FIG. 4 is a side view schematically showing a hydraulic excavator CM based on the embodiment.
Figure 5:
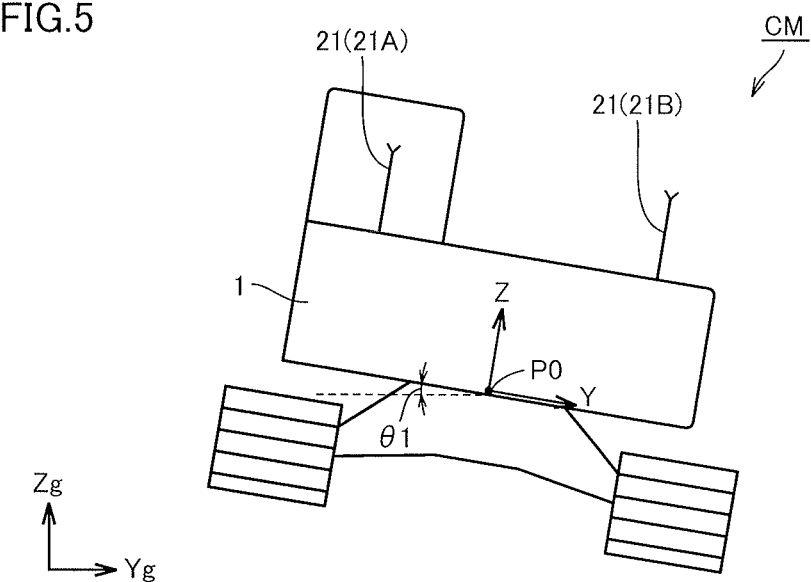
FIG. 5 is a rear view schematically showing hydraulic excavator CM based on the embodiment.
Figure 6:
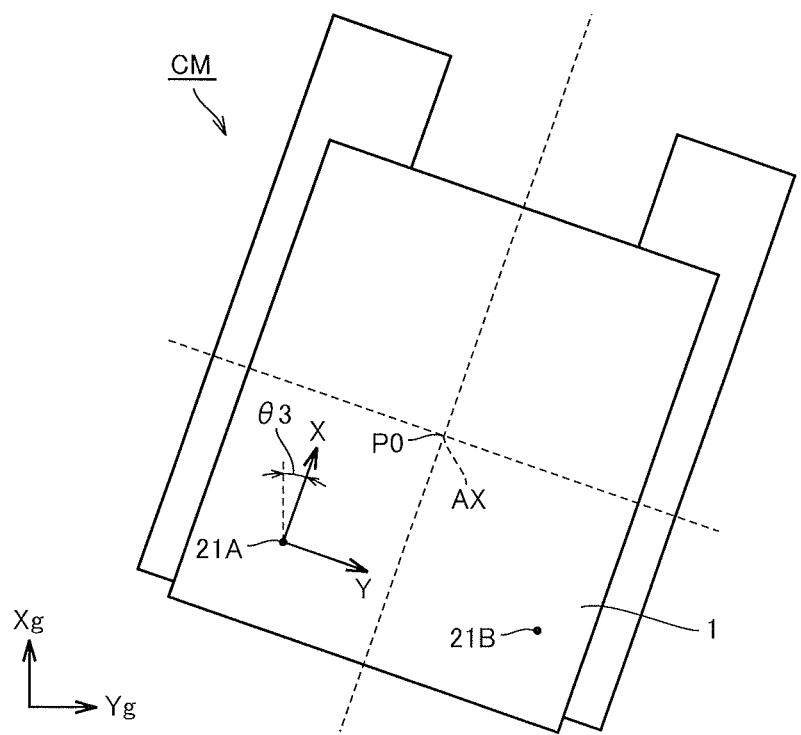
FIG. 6 is a plan view schematically showing hydraulic excavator CM based on the embodiment.

FIG. 4 is a side view schematically showing hydraulic excavator CM based on the embodiment. FIG. 5 is a rear view schematically showing hydraulic excavator CM based on the embodiment. FIG. 6 is a plan view schematically showing hydraulic excavator CM based on the embodiment.

A distance L1 between boom axis J1 and arm axis J2 is defined as a boom length L1. A distance L2 between arm axis J2 and bucket axis J3 is defined as an arm length L2. A distance L3 between bucket axis J3 and a distal end portion 8a of bucket 8 is defined as a bucket length L3. Distal end portion 8a of bucket 8 is a cutting edge of bucket 8.

Hydraulic excavator CM includes a position detection apparatus 20 capable of detecting vehicular body position data P showing a current position of vehicular body 1 and vehicular body attitude data Q showing an attitude of vehicular body 1.

Vehicular body position data P includes information on a current position (an Xg position, a Yg position, and a Zg position) of vehicular body 1 in the global coordinate system.

Vehicular body attitude data Q includes position information of revolving unit 3 in connection with the θXg direction, the θYg direction, and the θZg direction.

Vehicular body attitude data Q of vehicular body 1 has an angle of inclination (a roll angle) θ1 in the lateral direction of revolving unit 3 with respect to the horizontal plane (the XgYg plane), an angle of inclination (a pitch angle) θ2 in the fore/aft direction of revolving unit 3 with respect to the horizontal plane, and an angle (a yaw angle) θ3 formed between the reference azimuth (for example, north) in the global coordinate and an orientation in which revolving unit 3 (work implement 2) faces.

Position detection apparatus 20 has an antenna 21, a position sensor 23, and an inclination sensor 24.

Antenna 21 is an antenna for detecting a current position of vehicular body 1. Antenna 21 is an antenna for global navigation satellite systems (GNSS). Antenna 21 outputs a signal in accordance with a received radio wave (a GNSS radio wave) to position sensor 23.

Position sensor 23 includes a three-dimensional position sensor and a global coordinate operation portion, and detects an installation position Pr of antenna 21 in the global coordinate system. The global coordinate system is a three-dimensional coordinate system based on reference position Pg installed in an area of working. As shown in FIG. 4, reference position Pg is a position of a tip end of a reference marker set in the area of working.

Inclination sensor 24 is provided in revolving unit 3. Inclination sensor 24 has an inertial measurement unit (IMU). Position detection apparatus 20 obtains vehicular body attitude data Q including roll angle $\theta 1$ and pitch angle $\theta 2$ with the use of inclination sensor 24.

Figure 7:
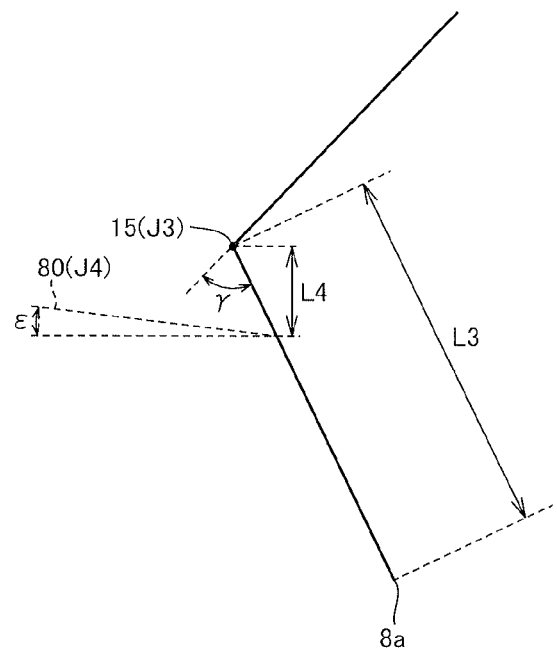
FIG. 7 is a side view schematically showing bucket 8 based on the embodiment.
Figure 8:
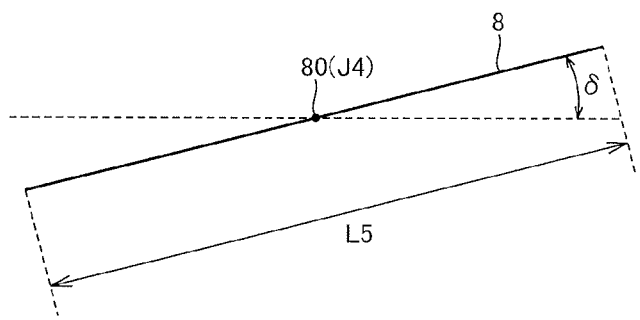
FIG. 8 is a front view schematically showing bucket 8 based on the embodiment.

FIG. 7 is a side view schematically showing bucket 8 based on the embodiment. FIG. 8 is a front view schematically showing bucket 8 based on the embodiment.

A distance L4 between bucket axis J3 and tilt axis J4 is defined as a tilt length L4. A distance L5 between side plate 84 and side plate 85 is defined as a width L5 of bucket 8.

Tilt angle $\delta$ represents an angle of inclination of bucket 8 with respect to the horizontal plane (the XgYg plane). Tilt angle $\delta$ is derived from a result of detection by tilt angle sensor 70.

A tilt axis angle $\epsilon$ represents an angle of inclination of tilt axis J4 (tilt pin 80) with respect to the XY plane in the local coordinate system. An angle of inclination of tilt axis J4 (a tilt axis absolute angle) with respect to the horizontal plane (the XgYg plane) in the global coordinate system is calculated by a sensor controller 32 (FIG. 9).

Overview of control system 200 based on the embodiment will now be described. Control system 200 controls an excavation operation with the use of work implement 2. Control of the excavation operation has excavation limit control by way of example.

[Excavation Limit Control]

Figure 9:
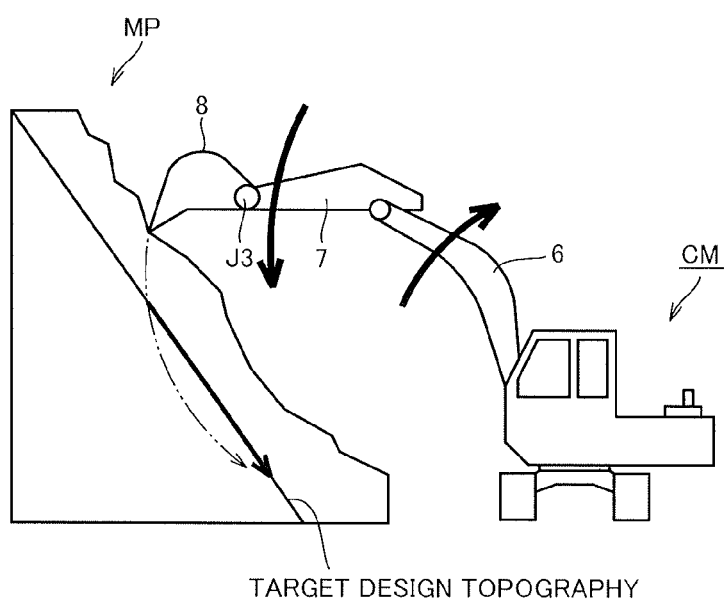
FIG. 9 is a diagram schematically showing one example of an operation of a work implement 2 at the time when excavation limit control (intervention control) is carried out.

FIG. 9 is a diagram schematically showing one example of an operation of work implement 2 at the time when excavation limit control (intervention control) is carried out.

As shown in FIG. 9, excavation limit control is carried out such that bucket 8 does not enter target design topography representing a two-dimensional aimed shape of an excavation target in a work implement operation plane MP orthogonal to bucket axis J3.

In excavation by bucket 8, control system 200 carries out automatic control such that boom 6 is raised with respect to an excavation operation of arm 7. In excavation, intervention control including a raising operation of boom 6 is effected such that bucket 8 does not enter the target design topography.

[Configuration of Control System]

Figure 10:
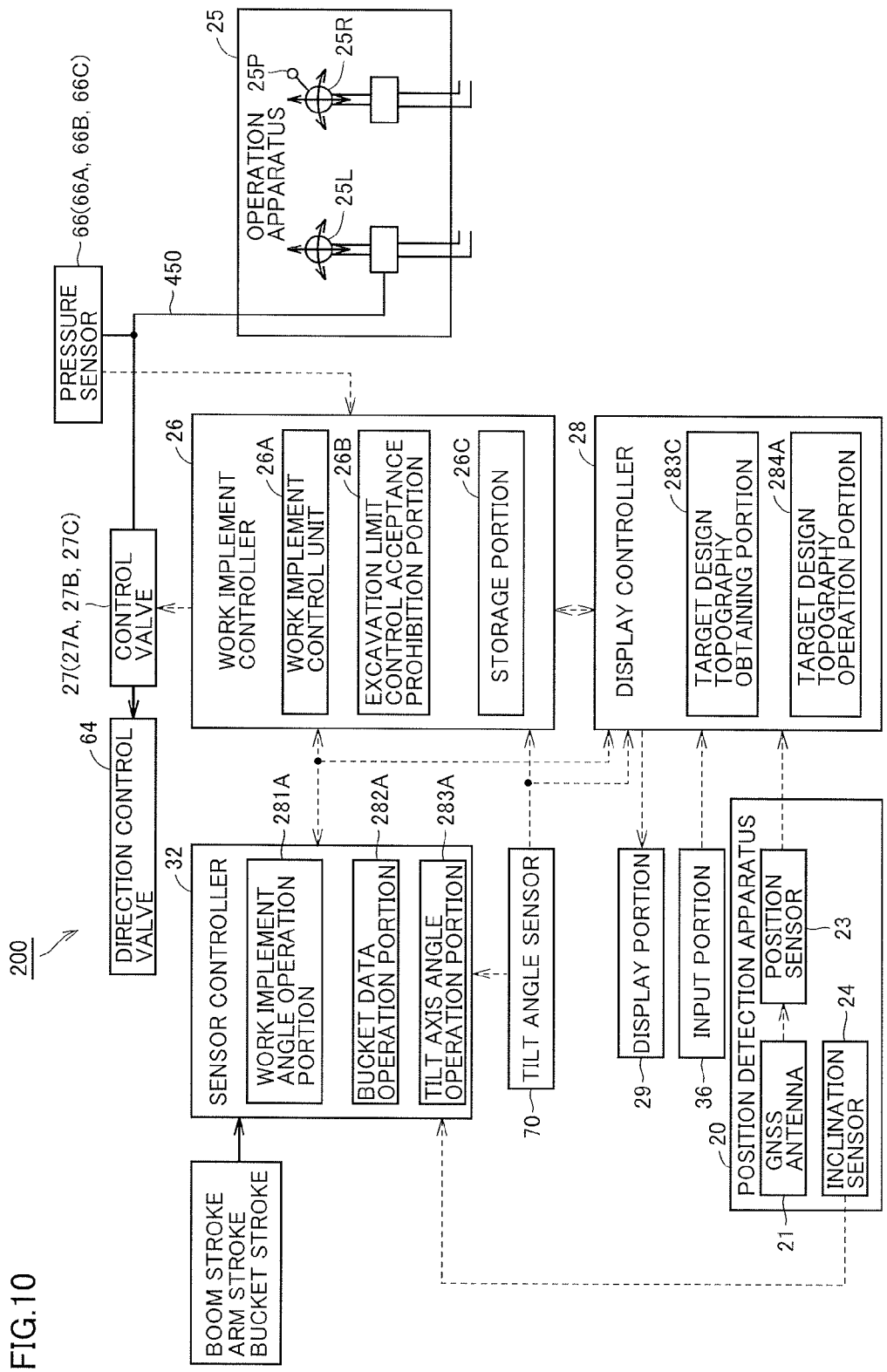
FIG. 10 is a block diagram showing a functional configuration of a control system 200 based on the embodiment.

FIG. 10 is a block diagram showing a functional configuration of control system 200 based on the embodiment.

As shown in FIG. 10, control system 200 includes position detection apparatus 20, tilt angle sensor 70, an operation apparatus 25, a work implement controller 26, a pressure sensor 66, a control valve 27, a direction control valve 64, a display controller 28, a display portion 29, an input portion 36, and sensor controller 32.

Display portion 29 displays prescribed information such as target design topography to be excavated under control by display controller 28.

Input portion 36 can include a touch panel to which an input is provided through the display portion, and it is operated by an operator for providing an input. By being operated by the operator, input portion 36 generates an operation signal based on the operation by the operator, and outputs the operation signal to display controller 28.

Operation apparatus 25 is arranged in operator's cab 4. The operator operates operation apparatus 25. Operation apparatus 25 accepts an operation by the operator for driving work implement 2. Operation apparatus 25 is an operation apparatus of a pilot hydraulic type.

Here, an oil supplied to the hydraulic cylinder (boom cylinder 10, arm cylinder 11, bucket cylinder 12, and tilt cylinder 30) in order to actuate the hydraulic cylinder is also referred to as a hydraulic oil. The hydraulic oil and the pilot oil may be delivered from the same hydraulic pump.

Operation apparatus 25 has a first control lever 25R, a second control lever 25L, and a third control lever 25P.

First control lever 25R is arranged, for example, on the right side of operator's seat 4S. Second control lever 25L is arranged, for example, on the left side of operator's seat 4S. Third control lever 25P is arranged, for example, on first control lever 25R. Third control lever 25P may be arranged on second control lever 25L. Operations of first control lever 25R and second control lever 25L in fore, aft, left, and right directions correspond to operations along two axes.

Boom 6 and bucket 8 are operated with the use of first control lever 25R. An operation of first control lever 25R in the fore/aft direction corresponds to the operation of boom 6, and an operation for lowering boom 6 and an operation for raising boom 6 are performed in response to the operation in the fore/aft direction. An operation of first control lever 25R in the lateral direction corresponds to the operation of bucket 8, and an excavation operation and a dumping operation by bucket 8 are performed in response to an operation in the lateral direction.

Arm 7 and revolving unit 3 are operated with the use of second control lever 25L. An operation of second control lever 25L in the fore/aft direction corresponds to the operation of arm 7, and a dumping operation and an excavation operation by arm 7 are performed in response to the operation in the fore/aft direction. The operation of second control lever 25L in the lateral direction corresponds to revolution of revolving unit 3, and an operation for revolving revolving unit 3 to the right and an operation for revolving unit 3 to the left are performed in response to the operation in the lateral direction.

Bucket 8 is operated with the use of third control lever 25P. Rotation of bucket 8 around bucket axis J3 is operated with the use of first control lever 25R. Rotation (tilt) of bucket 8 around tilt axis J4 is operated with the use of third control lever 25P.

A pilot oil delivered from the pilot hydraulic pump, of which pressure has been reduced by the control valve to a pilot oil pressure, is supplied to operation apparatus 25. The pilot oil pressure is regulated based on an amount of operation of operation apparatus 25, and direction control valve 64 through which a hydraulic oil supplied to the hydraulic cylinder (boom cylinder 10, arm cylinder 11, bucket cylinder 12, and tilt cylinder 30) flows is driven by the pilot oil pressure. Pressure sensor 66 is arranged in a pilot oil pressure line 450. Pressure sensor 66 detects a pilot oil pressure. A result of detection by pressure sensor 66 is output to work implement controller 26.

Control valve 27 is a proportional solenoid control valve and regulates a pilot oil pressure based on a control signal from work implement controller 26.

Sensor controller 32 includes a work implement angle operation portion 281A, a bucket data operation portion 282A, and a tilt axis angle operation portion 283A.

Work implement angle operation portion 281A calculates an angle of rotation α of boom 6 with respect to a perpendicular direction of vehicular body 1 from a boom cylinder length obtained based on a result of detection by first stroke sensor 16. Work implement angle operation portion 281A calculates an angle of rotation β of arm 7 with respect to boom 6 from an arm cylinder length obtained based on a result of detection by second stroke sensor 17. Work implement angle operation portion 281A calculates an angle of rotation γ of bucket 8 with respect to arm 7 from a bucket cylinder length obtained based on a result of detection by third stroke sensor 18.

Angle of rotation α of boom 6, angle of rotation β of arm 7, and angle of rotation γ of bucket 8 do not have to be detected by the stroke sensors. For example, an angle detector such as a rotary encoder may detect angle of rotation α of boom 6. The angle detector detects angle of rotation α by detecting an angle of bending of boom 6 with respect to revolving unit 3. Similarly, an angle detector attached to arm 7 may detect angle of rotation β of arm 7. An angle detector attached to bucket 8 may detect angle of rotation γ of bucket 8.

Tilt axis angle operation portion 283A calculates an angle of tilt axis J4 with respect to the horizontal plane (a tilt axis absolute angle) based on angles of rotation α to γ calculated by work implement angle operation portion 281A and vehicular body attitude data Q representing an angle of inclination of the vehicular body obtained by inclination sensor 24.

Specifically, tilt axis angle operation portion 283A calculates an angle of tilt axis J4 in the local coordinate system (a tilt axis angle) based on angles of rotation α to γ calculated by work implement angle operation portion 281A. Then, tilt axis angle operation portion 283A calculates a tilt axis absolute angle in the global coordinate system based on tilt axis angle and vehicular body attitude data Q.

Bucket data operation portion 282A generates bucket data showing an outer geometry of a cross-section of bucket 8 (a position of bucket 8) in the work implement operation plane based on angles of rotation α to γ, vehicular body attitude data Q, and tilt angle δ from tilt angle sensor 70.

Sensor controller 32 outputs angles of rotation α to γ, the tilt axis absolute angle, and bucket data to display controller 28 and work implement controller 26.

Display controller 28 obtains vehicular body position data P and vehicular body attitude data Q from position detection apparatus 20.

Tilt angle sensor 70 outputs bucket angle data to sensor controller 32, work implement controller 26, and display controller 28. Specifically, tilt angle sensor 70 outputs tilt angle δ to sensor controller 32. Tilt angle sensor 70 outputs pitch angle φ to work implement controller 26 and display controller 28.

Display controller 28 has a target design topography obtaining portion 283C and a target design topography operation portion 284A.

Display controller 28 calculates target design topography data and outputs the target design topography data to work implement controller 26.

Target design topography obtaining portion 283C obtains target construction information (three-dimensional design topography data) representing three-dimensional design topography which is a three-dimensional aimed shape of an excavation target and obtains vehicular body position data P and vehicular body attitude data Q from position detection apparatus 20.

Target design topography operation portion 284A generates target design topography data representing target design topography which is a two-dimensional aimed shape of an excavation target in the work implement operation plane from the data obtained by target design topography obtaining portion 283C and the bucket data obtained from bucket data operation portion 282A. The target construction information has coordinate data and angle data necessary for generation of target design topography data. The target construction information may be supplied to display controller 28, for example, through a radio communication apparatus or from an external memory.

Display controller 28 has display portion 29 display the target design topography based on the target design topography data generated by target design topography operation portion 284A.

Display controller 28 has display portion 29 display the target design topography based on the target design topography data and bucket data as well as a state of attitude of the bucket corresponding thereto.

Display portion 29 is implemented, for example, by a monitor, and displays various types of information on hydraulic excavator CM. Display portion 29 has a human-machine interface (HMI) monitor as a guidance monitor for information-oriented construction.

Display controller 28 can calculate a position in the local coordinate when it is viewed in the global coordinate system, based on a result of detection by position detection apparatus 20. The target design topography data output to work implement controller 26 is converted to a local coordinate, however, other operation in display controller 28 is performed in the global coordinate system.

An input from sensor controller 32 is also converted to the global coordinate system in display controller 28.

Work implement controller 26 has a work implement control unit 26A, an excavation limit control acceptance prohibition portion 26B, and a storage portion 26C.

Work implement control unit 26A controls an operation of the work implement. By way of example, work implement control unit 26A effects excavation limit control in which an operation of the work implement is controlled at least partially automatically.

Storage portion 26C stores data and various programs necessary for work implement control unit 26A to control an operation of the work implement.

Work implement control unit 26A obtains target design topography data and bucket data from display controller 28.

Work implement control unit 26A generates a control command to control valve 27 based on the target design topography data and the bucket data.

Work implement control unit 26A determines a speed limit in accordance with a distance between target design topography and bucket 8 based on target design topography representing design topography which is an aimed shape of an excavation target and bucket data showing a position of bucket 8, and controls work implement 2 such that a speed of work implement 2 in a direction toward the target design topography is not higher than the speed limit.

Thus, an excavation limit work in which a position of bucket 8 with respect to target design topography is controlled, entry of bucket 8 into the target design topography is suppressed, and a surface in accordance with the design topography is made can be carried out.

For excavation limit control, in addition to stop control for suppressing entry of bucket 8 into target design topography as described above, there is also control in which a land grading work along flat target design topography is partially automatically carried out.

In excavation limit control (intervention control), a control signal is output to control valve 27 connected to boom cylinder 10 and a position of boom 6 is controlled such that entry of bucket 8 into target design topography is suppressed.

Excavation limit control acceptance prohibition portion 26B prohibits effectuation of excavation limit control when a prescribed condition is satisfied. In the present example, effectuation of excavation limit control is prohibited based on pitch angle φ obtained from tilt angle sensor 70 and a tilt axis absolute angle obtained from sensor controller 32.

[Tilt Angle Sensor]

As described above, tilt angle sensor 70 detects tilt angle δ of bucket 8 with respect to the horizontal plane in the global coordinate system. Tilt angle sensor 70 is arranged in bucket 8, and as bucket 8 is inclined with respect to the horizontal plane, tilt angle sensor 70 outputs tilt angle data in accordance with an angle of inclination thereof to sensor controller 32.

As described above, bucket data operation portion 282A generates bucket data showing an outer geometry of a cross-section of bucket 8 (a position of bucket 8) in the work implement operation plane based on angles of rotation α to γ, vehicular body attitude data Q, and tilt angle δ from tilt angle sensor 70.

Figure 11:
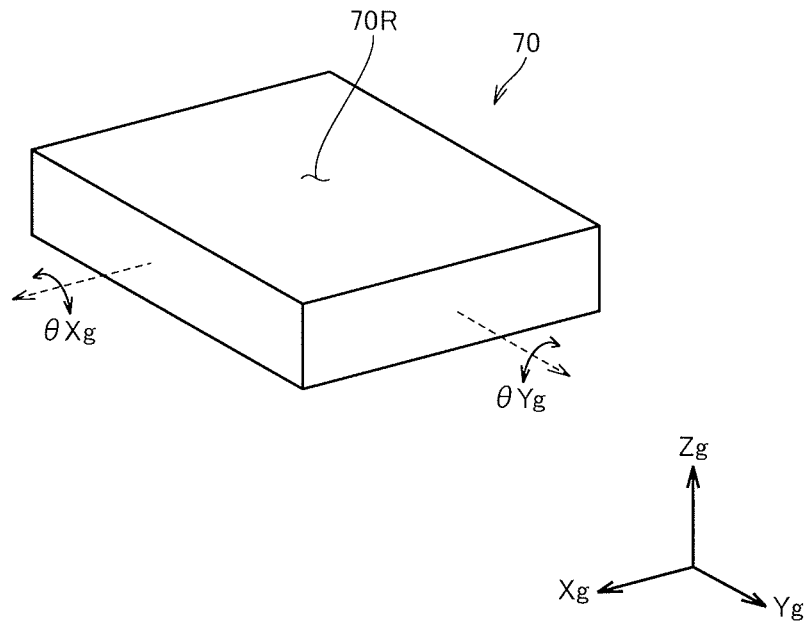
FIG. 11 is a schematic diagram for illustrating principles of a tilt angle sensor 70 based on the embodiment.

FIG. 11 is a schematic diagram for illustrating principles of tilt angle sensor 70 based on the embodiment.

As shown in FIG. 11, tilt angle sensor 70 detects a tilt angle with respect to the horizontal plane (the XgYg plane) in the global coordinate system. For example, a fluid-type inclination sensor can be used as tilt angle sensor 70.

Tilt angle sensor 70 is a dual-axis angle sensor detecting angles of inclination in two directions of the θXg direction and the θYg direction. Tilt angle sensor 70 has a reference surface 70R and detects an angle of inclination of reference surface 70R with respect to the horizontal plane. Specifically, tilt angle sensor 70 detects angle of rotation (tilt angle) δ of bucket 8 around tilt axis J4 in the θXg direction and angle of rotation (pitch angle) φ of bucket 8 around bucket axis J3 in the θYg direction.

Bucket 8 has an installation surface where tilt angle sensor 70 is installed, in the vicinity of the tilt pin. When the installation surface of bucket 8 and the horizontal plane are in parallel to each other, bucket 8 is in an initial attitude (a horizontal attitude). Tilt angle sensor 70 is installed on the installation surface of bucket 8 such that reference surface 70R and the horizontal plane (the installation surface) are in parallel to each other in a state of bucket 8 in the initial attitude.

In a state that reference surface 70R and the horizontal plane are in parallel to each other, accuracy in detection of a tilt angle by tilt angle sensor 70 is highest. In a state that reference surface 70R and the horizontal plane are orthogonal to each other, accuracy in detection of a tilt angle by tilt angle sensor 70 is lowest. When reference surface 70R is horizontal, accuracy in detection by tilt angle sensor 70 is improved, and when reference surface 70R is vertical, accuracy in detection by tilt angle sensor 70 is lowered.

Therefore, when an attitude of bucket 8 in which tilt angle sensor 70 is installed changes, accuracy in detection by tilt angle sensor 70 changes.

Figure 12:
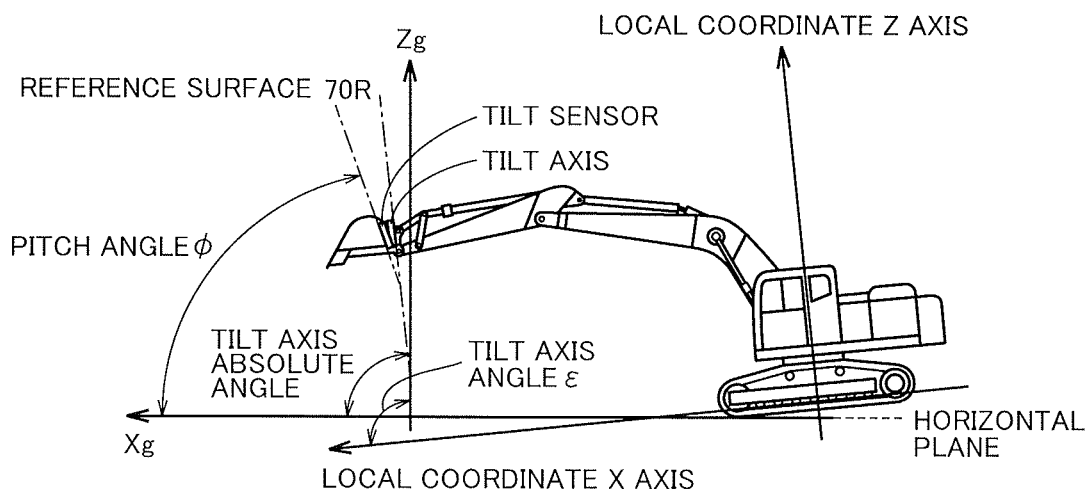
FIG. 12 is a diagram illustrating detection accuracy of the tilt angle sensor based on the embodiment.

FIG. 12 is a diagram illustrating accuracy in detection by the tilt angle sensor based on the embodiment.

As shown in FIG. 12, when an attitude of bucket 8 changes owing to an operation of boom 6 and arm 7 as well, accuracy in detection of a tilt angle by tilt angle sensor 70 may be lowered. For example, as work implement 2 is extended and reference surface 70R is closer to vertical (the pitch angle is closer to perpendicular with respect to the horizontal plane), accuracy in detection of a tilt angle by tilt angle sensor 70 is lowered.

Tilt angle sensor 70 is a dual-axis (the θXg direction and the θYg direction) angle sensor with respect to the horizontal plane. When reference surface 70R is closer to vertical, even in a case of rotation around tilt axis J4 owing to drive of tilt cylinder 30, reference surface 70R of tilt angle sensor 70 rotates with the vertical direction being maintained. Therefore, it becomes difficult to detect change in one axis (the θXg direction) with respect to the horizontal plane.

In installation of tilt angle sensor 70 in bucket 8, reference surface 70R of tilt angle sensor 70 and tilt axis J4 may not be in parallel to each other. Though bucket 8 rotates around tilt axis J4, accuracy in detection by tilt angle sensor 70 may lower as tilt axis J4 is closer to vertical (the tilt axis absolute angle is perpendicular to the horizontal plane).

Tilt angle sensor 70 is a dual-axis (the θXg direction and the θYg direction) angle sensor with respect to the horizontal plane. When tilt axis J4 is closer to vertical, even in a case of rotation around tilt axis J4 owing to drive of tilt cylinder 30, reference surface 70R of tilt angle sensor 70 rotates with the vertical direction being defined as the axis. Therefore, it becomes difficult to detect change in one axis (the θXg direction) with respect to the horizontal plane.

Thus, as an angle of reference surface 70R of tilt angle sensor 70 is closer to the vertical direction in the global coordinate system, accuracy in detection of a tilt angle by tilt angle sensor 70 lowers. When reference surface 70R of tilt angle sensor 70 and tilt axis J4 are not in parallel to each other, accuracy in detection of a tilt angle by tilt angle sensor 70 may lower also due to an angle of inclination of tilt axis J4 being closer to the vertical direction.

Consequently, when excavation limit control is effected based on tilt angle data (monitor data) obtained in real time from tilt angle sensor 70, excavation limit control based on tilt angle data output from tilt angle sensor 70 of which detection accuracy has lowered is carried out and excavation accuracy may lower.

[Prohibition of Excavation Limit Control]

In the present embodiment, in effecting excavation limit control, an excavation limit control mode is set by operating input portion 36 of control system 200.

Input portion 36 has a button indicating whether or not to effect excavation limit control (an excavation control mode switching button).

As the operator operates the excavation control mode switching button, a signal indicating at least one of start and quit of the excavation limit control mode is output to work implement controller 26.

As input portion 36 is operated, at least one of a command to start the excavation limit control mode and a command to quit the excavation limit control mode is output to work implement controller 26. A time point of start of the excavation limit control mode is a time point when the excavation control mode switching button is operated to start the excavation limit control mode. A time point of quit of the excavation limit control mode is a time point when the excavation control mode switching button is operated to quit the excavation limit control mode.

When accuracy in detection of tilt angle data by tilt angle sensor 70 is lowered, transition to the excavation limit control mode is prohibited. Specifically, excavation limit control acceptance prohibition portion 26B of work implement controller 26 instructs work implement control unit 26A to prohibit transition to the excavation limit control mode.

Excavation limit control acceptance prohibition portion 26B prohibits transition to the excavation limit control mode based on pitch angle data (pitch angle φ) input from tilt angle sensor 70. Transition to the excavation limit control mode is prohibited based on a tilt axis absolute angle input from tilt axis angle operation portion 283A of sensor controller 32.

Figure 13:
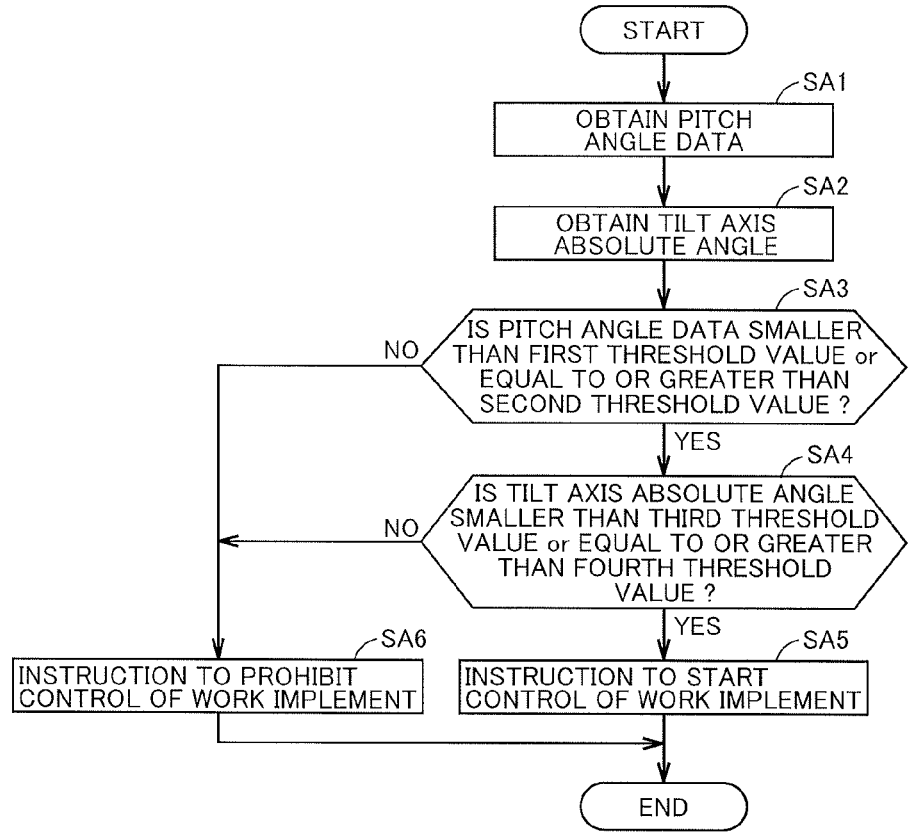
FIG. 13 is a flowchart for control of transition to an excavation limit control mode by an excavation limit control acceptance prohibition portion 26B.

FIG. 13 is a flowchart for control of transition to the excavation limit control mode by excavation limit control acceptance prohibition portion 26B.

As shown in FIG. 13, excavation limit control acceptance prohibition portion 26B obtains pitch angle data (step SA1). Specifically, excavation limit control acceptance prohibition portion 26B obtains pitch angle data of pitch angle φ from tilt angle sensor 70.

Then, excavation limit control acceptance prohibition portion 26B obtains a tilt axis absolute angle (step SA2). Specifically, excavation limit control acceptance prohibition portion 26B obtains a tilt axis absolute angle operated by tilt axis angle operation portion 283A.

Then, excavation limit control acceptance prohibition portion 26B determines whether pitch angle φ is smaller than a first threshold value or equal to or greater than a second threshold value (step SA3). Specifically, by determining whether pitch angle φ of bucket 8 is smaller than the first threshold value or equal to or greater than the second threshold value, whether or not reference surface 70R of tilt angle sensor 70 attached to bucket 8 is in the vicinity of vertical is determined. In the present example, the second threshold value is a value greater than the first threshold value.

When pitch angle φ is in a range equal to or greater than the first threshold value and smaller than the second threshold value, reference surface 70R is in the vicinity of vertical and accuracy in detection of tilt angle data by tilt angle sensor 70 is lowered. The range of pitch angle φ smaller than the first threshold value or equal to or greater than the second threshold value refers to a state that accuracy in detection of tilt angle data by tilt angle sensor 70 can be secured.

When pitch angle φ is equal to or greater than the first threshold value and smaller than the second threshold value (NO in step SA3), excavation limit control acceptance prohibition portion 26B prohibits transition to the excavation limit control mode (an instruction to prohibit control of the work implement) (step SA6). When reference surface 70R of tilt angle sensor 70 attached to bucket 8 is in the vicinity of vertical, accuracy in detection by tilt angle sensor 70 is lowered and hence transition to the excavation limit control mode is prohibited.

When pitch angle φ is smaller than the first threshold value or equal to or greater than the second threshold value (YES in step SA3), excavation limit control acceptance prohibition portion 26B determines whether a tilt axis absolute angle is smaller than a third threshold value or equal to or greater than a fourth threshold value (step SA4). Specifically, by determining whether the tilt axis absolute angle is smaller than the fourth threshold value or equal to or greater than the fourth threshold value, whether or not tilt axis J4 is in the vicinity of vertical is determined. In the present example, the fourth threshold value is a value greater than the third threshold value.

In a range of the tilt axis absolute angle equal to or greater than the third threshold value and smaller than the fourth threshold value, tilt axis 14 is in the vicinity of vertical, and accuracy in detection of tilt angle data by tilt angle sensor 70 is lowered. A range of the tilt axis absolute angle smaller than the third threshold value or equal to or greater than the fourth threshold value refers to a state that accuracy in detection of tilt angle data by tilt angle sensor 70 can be secured.

When the tilt axis absolute angle is equal to or greater than the third threshold value and smaller than the fourth threshold value (NO in step SA4), excavation limit control acceptance prohibition portion 26B prohibits transition to the excavation limit control mode (the instruction to prohibit control of the work implement) (step SA6). When tilt axis J4 is in the vicinity of vertical, accuracy in detection by tilt angle sensor 70 is lowered and hence transition to the excavation limit control mode is prohibited.

When the tilt axis absolute angle is smaller than the third threshold value or equal to or greater than the fourth threshold value (YES in step SA4), excavation limit control acceptance prohibition portion 26B permits transition to the excavation limit control mode (an instruction to start control of the work implement) (step SA5). When reference surface 70R of tilt angle sensor 70 is not in the vicinity of vertical and when tilt axis J4 is not in the vicinity of vertical, accuracy in detection by tilt angle sensor 70 can be secured and hence transition to the excavation limit control mode is permitted.

According to such a configuration, excavation limit control based on tilt angle data output from tilt angle sensor 70 of which detection accuracy has lowered is prohibited and excavation limit control based on tilt angle data high in detection accuracy is effected. Thus, excavation accuracy can be improved and intended construction can be carried out.

Though a case that both parameters of pitch angle φ and a tilt axis absolute angle are made use of and transition to the excavation limit control mode is prohibited in a state that accuracy in detection of tilt angle data is lowered has been described above, only any one of them can also be employed.

Though a case that transition to the excavation limit control mode is prohibited when pitch angle φ is equal to or greater than the first threshold value and smaller than the second threshold value has been described above, transition to the excavation limit control mode may be prohibited when pitch angle φ is equal to or greater than the first threshold value. Though a case that transition to the excavation limit control mode is prohibited when a tilt axis absolute angle is equal to or greater than the third threshold value and smaller than the fourth threshold value has been described, transition to the excavation limit control mode may be prohibited when the tilt axis absolute angle is equal to or greater than the third threshold value.

Excavation limit control acceptance prohibition portion 26B may prohibit acceptance of a button in input portion 36, which indicates whether or not to carry out excavation limit control (the excavation limit mode switching button). Specifically, the button may be set to inactive. Thus, the operator can be informed of the fact that excavation accuracy has lowered and the operator can be invited to effect excavation limit control in a state that excavation accuracy is high.

If the button is displayed on display portion 29, display of the button may be canceled. Alternatively, representation may be varied so as to show that the button is inactive (for example, graying out).

Alternatively, the fact that excavation limit control cannot be effected may be displayed.

Figure 14:
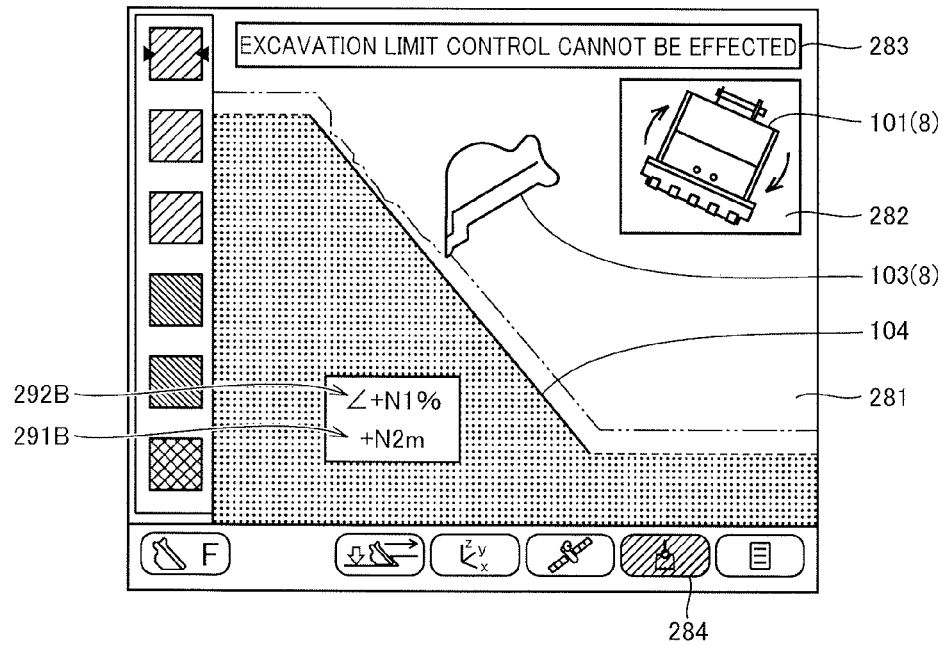
FIG. 14 is a diagram showing one example of a display portion 29 based on the embodiment.

FIG. 14 is a diagram showing one example of display portion 29 based on the embodiment.

As shown in FIG. 14, display portion 29 displays target design topography and a state of attitude of bucket 8 corresponding thereto based on target design topography data and bucket data.

A screen on display portion 29 has a front view 282 showing a tilt angle of bucket 8 and a side view 281 showing target design topography and bucket 8. Front view 282 has an icon 101 showing bucket 8.

Side view 281 has an icon 103 showing bucket 8 and a line 104 showing a surface of target design topography in the work implement operation plane. Icon 103 shows an outer geometry of bucket 8 in the work implement operation plane. Side view 281 has distance data 291B showing a distance between the target design topography and bucket 8 (a shortest distance between the target design topography and bucket 8) and angle data 292B showing an angle formed between the target design topography and a bottom surface of bucket 8.

With such representation, a control target is specified with the work implement operation plane being defined as the reference, and excavation limit control is accurately carried out.

In the present example, a message 283 to the effect that excavation limit control cannot be effected is displayed on display portion 29.

Thus, the operator can be notified of the fact that excavation accuracy has lowered and hence the operator can be invited to effect excavation limit control in a state that excavation accuracy is high.

An icon 284 showing accuracy in detection of tilt angle data can also be provided. Display controller 28 varies a state of icon 284 in accordance with a state of accuracy in detection of tilt angle data. Specifically, a state of icon 284 is switched between a state that accuracy in detection of tilt angle data is lowered and a state that accuracy in detection of tilt angle data can be secured.

As a result of switching between the states, the operator can instantaneously know a condition of accuracy in detection of tilt angle data, and an excavation work high in accuracy can be carried out.

In switching between the states, the state can be varied by varying a color. Alternatively, a static manner can be varied by varying a form of an icon. Alternatively, a dynamic manner can be varied by varying a speed of blinking. Not only variation in two steps but also variation in manner in a plurality of steps may be applicable. For example, a manner of an icon may be varied between a state that accuracy in detection of tilt angle data is higher in which reference surface 70R of tilt angle sensor 70 is closer to the horizontal plane and a state that detection accuracy is high. Furthermore, variation in accordance with tilt angle data can also be made.

By thus notifying the operator of the fact that excavation accuracy has lowered, the operator can be invited to carry out an excavation work in a state that excavation accuracy is high. As a method of giving a notification that excavation accuracy has lowered, in addition to the above, notification through voice and sound from a speaker may be applicable. Alternatively, notification through a not-shown vibration member which can be vibrated may be applicable. Alternatively, notification through a scheme which is combination of the above may be applicable.

Another Embodiment

As another embodiment, display control of target design topography displayed on the display portion can also be effected based on accuracy in detection of tilt angle data.

Figure 15:
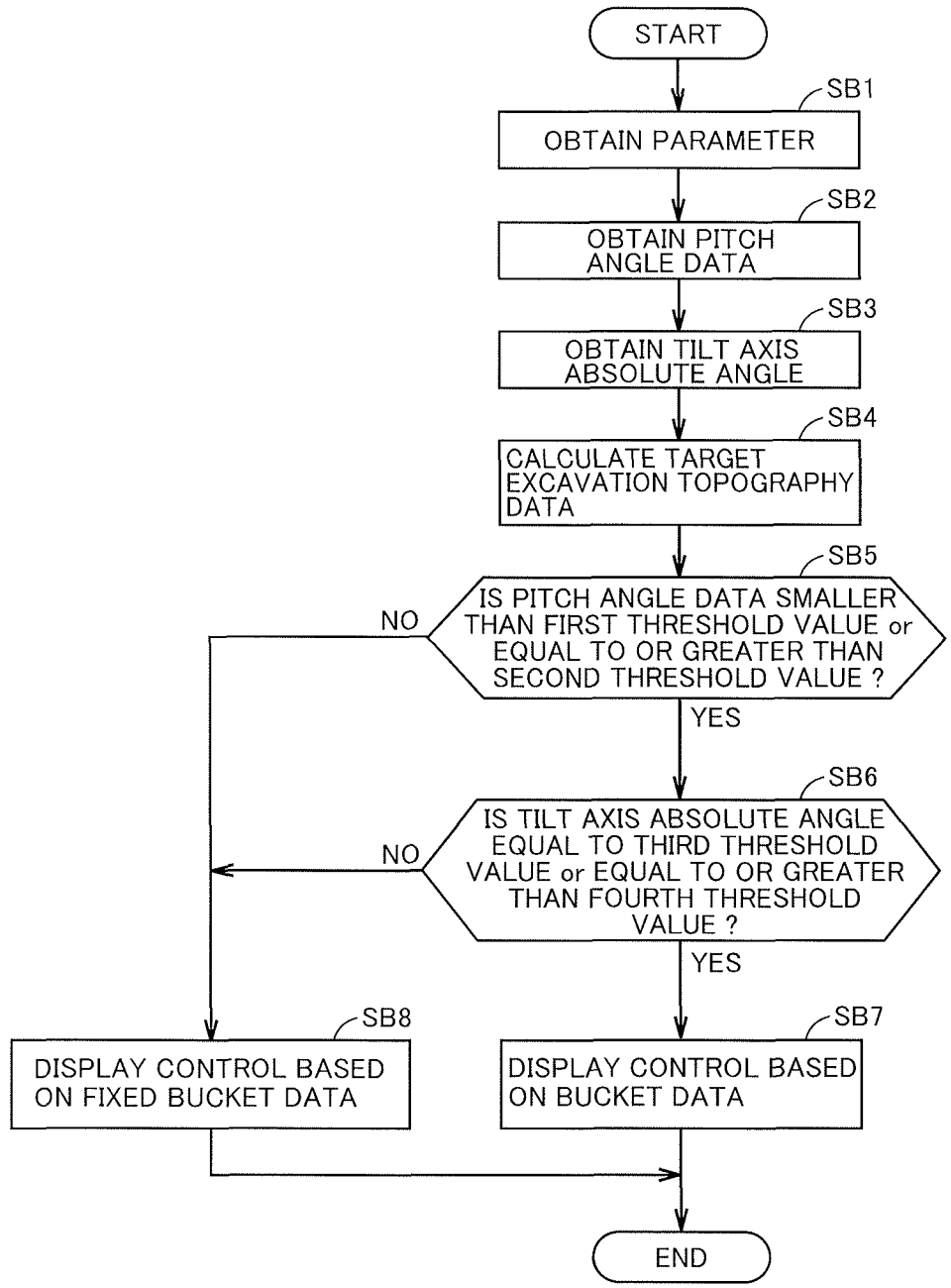
FIG. 15 is a flowchart illustrating display processing by a display controller 28 based on another embodiment.

FIG. 15 is a flowchart illustrating display processing by display controller 28 based on another embodiment.

As shown in FIG. 15, target design topography obtaining portion 283C of display controller 28 obtains a parameter (step SB1). Specifically, target design topography obtaining portion 283C obtains a parameter such as attitude information on an attitude of the work implement. Target design topography obtaining portion 283C obtains vehicular body position data P, vehicular body attitude data Q, target construction information, and bucket data from bucket data operation portion 282A.

Then, target design topography obtaining portion 283C obtains pitch angle data (step SB2). Specifically, target design topography obtaining portion 283C obtains pitch angle data of pitch angle (l) from tilt angle sensor 70.

Then, target design topography obtaining portion 283C obtains a tilt axis absolute angle (step SB3). Specifically, target design topography obtaining portion 283C obtains a tilt axis absolute angle operated by tilt axis angle operation portion 283A.

Then, target design topography operation portion 284A calculates target design topography data (step SB4). Target design topography operation portion 284A generates target design topography data based on parameter data obtained by target design topography obtaining portion 283C.

Then, target design topography operation portion 284A determines whether pitch angle $\phi$ is smaller than the first threshold value or equal to or greater than the second threshold value (step SB5). Specifically, by determining whether pitch angle $\phi$ of bucket 8 is smaller than the first threshold value or equal to or greater than the second threshold value, whether or not reference surface 70R of tilt angle sensor 70 attached to bucket 8 is in the vicinity of vertical is determined. A range of pitch angle $\phi$ equal to or greater than the first threshold value and smaller than the second threshold value refers to a case that reference surface 70R is in the vicinity of vertical and accuracy in detection of tilt angle data by tilt angle sensor 70 is lowered. A range of pitch angle $\phi$ smaller than the first threshold value or equal to or greater than the second threshold value refers to a state that accuracy in detection of tilt angle data by tilt angle sensor 70 can be secured.

When pitch angle $\phi$ is equal to or greater than the first threshold value and smaller than the second threshold value (NO in step SB5), target design topography operation portion 284A effects display control based on fixed bucket data (step SB8). When reference surface 70R of tilt angle sensor 70 attached to bucket 8 is in the vicinity of vertical, accuracy in detection by tilt angle sensor 70 is lowered.

Therefore, in the present example, display control based on bucket data in a state that detection accuracy is high is effected. Specifically, when pitch angle $\phi$ is equal to or greater than the first threshold value and smaller than the second threshold value, tilt angle data at the time when pitch angle $\phi$ is smaller than the first threshold value or equal to or greater than the second threshold value is used and display control based on that tilt angle data is effected. By thus holding tilt angle data at the time when pitch angle $\phi$ is smaller than the first threshold value or equal to or greater than the second threshold value and fixing the tilt angle data, representation based on the tilt angle data high in accuracy can be provided. Front view 282 in FIG. 14 shows bucket 8 based on fixed tilt angle data by way of example.

When target design topography operation portion 284A determines that pitch angle φ is smaller than the first threshold value or equal to or greater than the second threshold value (YES in step SB5), target design topography operation portion 284A determines whether a tilt axis absolute angle is smaller than the third threshold value or equal to or greater than the fourth threshold value (step SB6). Specifically, by determining whether the tilt axis absolute angle is smaller than the third threshold value or equal to or greater than the fourth threshold value, whether or not tilt axis J4 is in the vicinity of vertical is determined. In a range of the tilt axis absolute angle equal to or greater than the third threshold value and smaller than the fourth threshold value, tilt axis J4 is in the vicinity of vertical and accuracy in detection of tilt angle data by tilt angle sensor 70 is lowered. A range of the tilt axis absolute angle smaller than the third threshold value or equal to or greater than the fourth threshold value refers to a state that accuracy in detection of tilt angle data by tilt angle sensor 70 can be secured.

When the tilt axis absolute angle is equal to or greater than the third threshold value and smaller than the fourth threshold value (NO in step SB6), target design topography operation portion 284A effects display control based on the fixed bucket data (step SB8). When reference surface 70R of tilt angle sensor 70 attached to bucket 8 is in the vicinity of vertical, accuracy in detection by tilt angle sensor 70 is lowered and hence display control based on the bucket data in a state that detection accuracy is high is effected.

When the tilt axis absolute angle is smaller than the third threshold value or equal to or greater than the fourth threshold value (YES in step SB6), target design topography operation portion 284A effects display control based on the currently obtained bucket data (step SB7). When reference surface 70R of tilt angle sensor 70 is not in the vicinity of vertical and tilt axis J4 is not in the vicinity of vertical, accuracy in detection by tilt angle sensor 70 can be secured and hence display control based on bucket data operated by bucket data operation portion 282A in that state is effected.

According to such a configuration, display control of the bucket based on tilt angle data output from tilt angle sensor 70 of which detection accuracy has been lowered is prohibited and display control of the bucket based on tilt angle data high in detection accuracy is effected. Thus, excavation accuracy can be improved and intended construction can be carried out.

Though a case that transition to display control based on fixed tilt angle data is made by making use of both parameters of pitch angle φ and a tilt axis absolute angle while accuracy in detection of tilt angle data is lowered has been described above, only any one of them can also be employed.

Though a case that display control based on the fixed bucket data is effected when pitch angle φ is equal to or greater than the first threshold value and smaller than the second threshold value has been described above, display control based on the fixed bucket data may be effected when pitch angle φ is equal to or greater than the first threshold value. Though a case that display control based on the fixed bucket data is effected when a tilt axis absolute angle is equal to or greater than the third threshold value and smaller than the fourth threshold value has been described, display control based on the fixed bucket data may be effected when the tilt axis absolute angle is equal to or greater than the third threshold value.

While display control on display portion 29, of the bucket based on the fixed tilt angle data is effected, a state of attitude of bucket 8 on display portion 29 is displayed in a fixed manner even though tilt angle δ of bucket 8 is changed in response to an operation by the operator.

Thus, generation and display of bucket data based on tilt angle data output from tilt angle sensor 70 of which detection accuracy is lowered can be avoided.

When detection accuracy is lowered, movement of the bucket displayed on display portion 29 may suddenly vary (wobble) due to an error. In this case, a difference is created between an actual state of bucket 8 in response to an operation of a control lever and a state of the bucket displayed on display portion 29, which may lead to misrecognition by the operator and failure to carry out an excavation work high in accuracy. For example, a bucket displayed on display portion 29 may be displayed as if it were operating, despite the fact that the control lever is not operated.

According to the scheme, when accuracy in detection by tilt angle sensor 70 has lowered, representation based on information low in detection accuracy is stopped and switching to representation based on information high in detection accuracy before lowering in detection accuracy is made for better visibility. Thus, misrecognition by the operator associated with representation of the bucket can be suppressed and an excavation work high in accuracy can be carried out. When detection accuracy returns to the original state, recovery from such a state can be made in an early stage and representation high in accuracy can be provided.

Values for distance data 291B representing a distance between target design topography and bucket 8 (a shortest distance between the target design topography and bucket 8) and angle data 292B representing an angle formed between the target design topography and the bottom surface of bucket 8 described with reference to FIG. 15 may fluctuate (wobble) based on tilt angle data output from tilt angle sensor 70 of which detection accuracy is lowered, however, with the scheme, representation based on information low in detection accuracy is stopped and switching to representation based on information high in detection accuracy is made for better visibility.

<Others>

The number of axes around which bucket 8 is inclined may be increased by one, and a bucket may be inclined with respect to an axis perpendicular to the horizontal plane (a vertical axis). In this case, a sensor capable of detecting an angle with respect to each of three axes is desirably adopted as a tilt angle sensor.

In the embodiment, vehicular body position data P and vehicular body attitude data Q of hydraulic excavator CM in the global coordinate system are obtained, and a relative position of target design topography and bucket 8 in the global coordinate system is obtained with the use of a position of bucket 8 (bucket data S) found in the local coordinate system as well as vehicular body position data P and vehicular body attitude data Q. The target design topography data may be defined in the local coordinate system and a relative position of the target design topography and bucket 8 in the local coordinate system may be obtained. This is also applicable to an embodiment below.

Though a hydraulic excavator has been exemplified by way of example of a work vehicle in the embodiment above, the present invention may be applied to a work vehicle of other types without being limited to the hydraulic excavator.

A position of hydraulic excavator CM in the global coordinate system may be obtained by other positioning means, without being limited to GNSS. Therefore, a distance between a distal end portion of the bucket and target design topography may be obtained by other positioning means, without being limited to GNSS.

An amount of operation of the boom, an amount of operation of the arm, and an amount of operation of the bucket may be obtained based on an electrical signal showing a position of a control lever (25R, 25L).

Though a hydraulic excavator has been described by way of example of a work vehicle in the present example, application also to such a work vehicle as a crawler dozer or a wheel loader is possible.

Though the embodiment of the present invention has been described above, it should be understood that the embodiment disclosed herein is illustrative and non-restrictive in every respect. The scope of the present invention is defined by the terms of the claims, and is intended to include any modifications within the scope and meaning equivalent to the terms of the claims.

REFERENCE SIGNS LIST 1 vehicular body; 2 work implement; 3 revolving unit; 4 operator's cab; 4S operator's seat; 5 traveling apparatus; 5Cr crawler belt; 6 boom; 7 arm; 8 bucket; 9 engine compartment; 10 boom cylinder; 11 arm cylinder; 1.2 bucket cylinder; 13 boom pin; 14 arm pin; 15 bucket pin; 16 to 18 first to third stroke sensors; 19 handrail; 20 position detection apparatus; 21 antenna; 21A first antenna; 21B second antenna; 23 position sensor; 24 inclination sensor; 25 operation apparatus; 26 work implement controller; 26A work implement control unit; 26B excavation limit control acceptance prohibition portion; 28 display controller; 29 display portion; 30 tilt cylinder; 32 sensor controller; 36 input portion; 70 tilt angle sensor; and CM hydraulic excavator.

The invention claimed is:

1. A work vehicle, comprising:
    a vehicular body;
    a work implement containing a boom rotatable with respect to said vehicular body around a boom axis, an arm rotatable with respect to said boom around an arm axis in parallel to said boom axis, and a bucket rotatable with respect to said arm around a bucket axis in parallel to said arm axis and a tilt axis orthogonal to said bucket axis;
    an angle sensor provided in said bucket and detecting an angle of inclination of the bucket with respect to a horizontal plane; and
    a work implement control unit executing control of the work implement in which an operation of said work implement is controlled at least partially automatically based on design topography representing an aimed shape of a target of working by said work implement, said work implement control unit starting control of said work implement when an angle of inclination of the bucket detected by said angle sensor is smaller than a first threshold value and not starting control of said work implement when an angle of inclination of the bucket detected by said angle sensor is equal to or greater than said first threshold value.

2. The work vehicle according to claim 1, wherein said work implement control unit starts control of said work implement when the angle of inclination of the bucket detected by said angle sensor is smaller than the first threshold value or equal to or greater than a second threshold value, and
does not start control of said work implement when the angle of inclination of the bucket detected by said angle sensor is equal to or greater than said first threshold value and smaller than the second threshold value.

3. The work vehicle according to claim 1, further comprising:
    an inclination detection portion detecting an inclination of the vehicular body with respect to the horizontal plane;
    an attitude state obtaining portion obtaining attitude information on an attitude of the work implement; and
    a tilt axis angle calculation portion calculating an angle of inclination of the tilt axis with respect to the horizontal plane based on the inclination of said vehicular body and the attitude information of said work implement, wherein
    said work implement control unit starts control of said work implement when an angle of inclination of the tilt axis calculated by said tilt axis angle calculation portion is smaller than a second threshold value, and
    does not start control of said work implement when the angle of inclination of the tilt axis calculated by said tilt axis angle calculation portion is equal to or greater than said second threshold value.

4. The work vehicle according to claim 1, further comprising an operation portion capable of accepting an instruction to start control of said work implement from an operator, wherein
    said work implement control unit executes control of said work implement in response to the instruction to start issued from said operation portion, and
    said operation portion does not accept the instruction to start control of said work implement from said operator when the angle of inclination of the bucket detected by said angle sensor is equal to or greater than the first threshold value.

5. The work vehicle according to claim 4, further comprising:
    a display portion; and
    a display control unit controlling contents of display on said display portion, wherein
    said display control unit has said display portion display information that control of said work implement cannot be started by said operator when the angle of inclination of the bucket detected by said angle sensor is equal to or greater than the first threshold value.

6. A work vehicle, comprising:
    a vehicular body;
    a work implement containing a boom rotatable with respect to said vehicular body around a boom axis, an arm rotatable with respect to said boom around an arm axis in parallel to said boom axis, and a bucket rotatable with respect to said arm around a bucket axis in parallel to said arm axis and a tilt axis orthogonal to said bucket axis;
    an inclination detection portion detecting an inclination of the vehicular body with respect to a horizontal plane;
    an attitude state obtaining portion obtaining attitude information on an attitude of the work implement;
    a tilt axis angle calculation portion calculating an angle of inclination of the tilt axis with respect to the horizontal plane based on the inclination of said vehicular body and the attitude information of said work implement; and a work implement control unit executing control of the work implement in which an operation of said work implement is controlled at least partially automatically based on design topography representing an aimed shape of a target of working by said work implement, said work implement control unit starting control of said work implement when an angle of inclination of the tilt axis calculated by said tilt axis angle calculation portion is smaller than a first threshold value, and not starting control of said work implement when an angle of inclination of the tilt axis calculated by said tilt axis angle calculation portion is equal to or greater than said first threshold value.

7. The work vehicle according to claim 6, wherein
said work implement control unit starts control of said work implement when the angle of inclination of the tilt axis calculated by said tilt axis angle calculation portion is smaller than the first threshold value or equal to or greater than a second threshold value, and does not start control of said work implement when the angle of inclination of the tilt axis calculated by said tilt axis angle calculation portion is equal to or greater than said first threshold value and smaller than the second threshold value.

8. The work vehicle according to claim 6, further comprising an operation portion capable of accepting an instruction to start control of said work implement from an operator, wherein
said work implement control unit executes control of said work implement in response to the instruction to start issued from said operation portion, and
said operation portion does not accept the instruction to start control of said work implement from said operator when the angle of inclination of the tilt axis calculated by said tilt axis angle calculation portion is equal to or greater than the first threshold value.

9. The work vehicle according to claim 8, further comprising:
a display portion; and
a display control unit controlling contents of display on said display portion, wherein
said display control unit has said display portion display information that control of said work implement cannot be started by said operator when the angle of inclination of the tilt axis calculated by said tilt axis angle calculation portion is equal to or greater than the first threshold value.

10. A work vehicle, comprising:
a vehicular body;
a work implement including a boom rotatable with respect to said vehicular body around a boom axis, an arm rotatable with respect to said boom around an arm axis in parallel to said boom axis, and a bucket rotatable with respect to said arm around a bucket axis in parallel to said arm axis and a tilt axis orthogonal to said bucket axis;
an angle sensor provided in said bucket and detecting an angle of inclination of the bucket with respect to a horizontal plane;
an attitude state obtaining portion obtaining attitude information on an attitude of said work implement based on a result of detection by said angle sensor; and
a display control unit including a state of attitude of said bucket with respect to design topography representing an aimed shape of a target of working by said work implement displayed based on said attitude information, when an angle of inclination of the bucket detected by said angle sensor is smaller than a first threshold value, said display control unit including the state of attitude of said bucket in accordance with the angle of inclination of the bucket detected by said angle sensor displayed, and when the angle of inclination of the bucket detected by said angle sensor is equal to or greater than said first threshold value, said display control unit including the state of attitude of said bucket displayed based on a result of detection by said angle sensor obtained when the angle of inclination of the bucket detected by said angle sensor was smaller than the first threshold value.

11. The work vehicle according to claim 10, further comprising:
an inclination detection portion detecting an inclination of the vehicular body; and
a tilt axis angle calculation portion calculating an angle of inclination of a tilt axis with respect to the horizontal plane based on the inclination of said vehicular body and the attitude information of said work implement, wherein
when the angle of inclination of the tilt axis calculated by said tilt axis angle calculation portion is smaller than a second threshold value and the angle of inclination of the bucket detected by said angle sensor is smaller than the first threshold value, said display control unit has the state of attitude of said bucket in accordance with the angle of inclination of the bucket detected by said angle sensor displayed, and when the angle of inclination of the tilt axis calculated by said tilt axis angle calculation portion is equal to or greater than said second threshold value or the angle of inclination of the bucket detected by said angle sensor is equal to or greater than said first threshold value, said display control unit has the state of attitude of said bucket displayed based on a result of detection by said angle sensor obtained when the angle of inclination of the bucket detected by said angle sensor was smaller than the first threshold value.

12. The work vehicle according to claim 10, wherein
when the angle of inclination of the bucket detected by said angle sensor is equal to or greater than said first threshold value, said display control unit has the state of attitude of said bucket displayed in a fixed manner based on a result of detection by said angle sensor obtained when the angle of inclination of the bucket detected by said angle sensor was smaller than the first threshold value.

13. The work vehicle according to claim 10, wherein
said display control unit further has an icon displayed, which indicates accuracy in detection by said angle sensor, and varies a state of said icon based on the angle of inclination of the bucket detected by said angle sensor.

14. A method of controlling a work vehicle including a work implement containing a boom rotatable with respect to a vehicular body around a boom axis, an arm rotatable with respect to said boom around an arm axis in parallel to said boom axis, and a bucket rotatable with respect to said arm around a bucket axis in parallel to said arm axis and a tilt axis orthogonal to said bucket axis, comprising the steps of:
detecting an angle of inclination of the bucket with respect to a horizontal plane;
starting control of the work implement in which an operation of said work implement is controlled at least partially automatically based on design topography representing an aimed shape of a target of working by said work implement when a detected angle of inclination of the bucket is smaller than a first threshold value; and not starting control of said work implement when the detected angle of inclination of the bucket is equal to or greater than said first threshold value.

15. A method of controlling a work vehicle including a work implement containing a boom rotatable with respect to a vehicular body around a boom axis, an arm rotatable with respect to said boom around an arm axis in parallel to said boom axis, and a bucket rotatable with respect to said arm around a bucket axis in parallel to said arm axis and a tilt axis orthogonal to said bucket axis, comprising the steps of:

detecting an inclination of the vehicular body with respect to a horizontal plane;

obtaining attitude information on an attitude of said work implement;

calculating an angle of inclination of a tilt axis with respect to the horizontal plane based on the inclination of said vehicular body and the attitude information of said work implement;

starting control of the work implement in which an operation of said work implement is controlled at least partially automatically based on design topography representing an aimed shape of a target of working by said work implement when a calculated angle of inclination of the tilt axis is smaller than a first threshold value; and not starting control of said work implement when the calculated angle of inclination of the tilt axis is equal to or greater than said first threshold value.

16. A method of controlling a work vehicle including a work implement containing a boom rotatable with respect to said vehicular body around a boom axis, an arm rotatable with respect to said boom around an arm axis in parallel to said boom axis, and a bucket rotatable with respect to said arm around a bucket axis in parallel to said arm axis and a tilt axis orthogonal to said bucket axis, comprising the steps of:

detecting an angle of inclination of the bucket with respect to a horizontal plane;

obtaining attitude information on an attitude of said work implement based on the detected angle of inclination of the bucket;

displaying a state of attitude of said bucket with respect to design topography representing an aimed shape of a target of working by said work implement based on said attitude information when the detected angle of inclination of the bucket is smaller than a first threshold value; and when the detected angle of inclination of the bucket is equal to or greater than said first threshold value, obtaining the attitude information based on the angle of inclination of the bucket obtained when the angle of inclination of the bucket was smaller than the first threshold value and displaying a state of attitude of said bucket based on the attitude information.

* * * * *